(12) United States Patent
Nordholt et al.

(10) Patent No.: US 10,564,933 B2
(45) Date of Patent: *Feb. 18, 2020

(54) QUANTUM RANDOM NUMBER GENERATORS

(71) Applicant: Triad National Security, LLC, Los Alamos, NM (US)

(72) Inventors: Jane Elizabeth Nordholt, Los Alamos, NM (US); Richard John Hughes, Los Alamos, NM (US); Raymond Thorson Newell, Santa Fe, NM (US); Charles Glen Peterson, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/884,871

(22) Filed: Jan. 31, 2018

(65) Prior Publication Data
US 2018/0239592 A1    Aug. 23, 2018

Related U.S. Application Data

(63) Continuation of application No. 14/812,623, filed on Jul. 29, 2015, now Pat. No. 10,019,235, which is a (Continued)

(51) Int. Cl.
*G06F 7/58*    (2006.01)
*H04L 9/08*    (2006.01)

(52) U.S. Cl.
CPC ............ *G06F 7/588* (2013.01); *H04L 9/0852* (2013.01)

(58) Field of Classification Search
None
See application file for complete search history.

(56) References Cited

U.S. PATENT DOCUMENTS

| 5,986,790 | A  | 11/1999 | Ota et al. |
| 8,204,378 | B1 | 6/2012  | Marsland, Jr. et al. |

(Continued)

FOREIGN PATENT DOCUMENTS

| JP | 2009070009 A | 4/2009 |
| JP | 2011034397 A | 2/2011 |
| JP | 5586805 A    | 11/2015 |
| WO | 2014058150   | 4/2014 |

OTHER PUBLICATIONS

Barker, et al. "Recommendation for Random Number Generation Using Deterministic Random Bit Generators" National Institute of Standards and Technology Special Publication 800-90A; 137 pages; Jun. 2015.

(Continued)

*Primary Examiner* — David H Malzahn
(74) *Attorney, Agent, or Firm* — Pierce Atwood LLP; Kevin M. Farrell; Christopher A. Baxter

(57) ABSTRACT

Random number generators include a thermal optical source and detector configured to produce random numbers based on quantum-optical intensity fluctuations. An optical flux is detected, and signals proportional to optical intensity and a delayed optical intensity are combined. The combined signals can be electrical signals or optical signals, and the optical source is selected so as to have low coherence over a predetermined range of delay times. Balanced optical detectors can be used to reduce common mode noise, and in some examples, the optical flux is directed to only one of a pair of balanced detectors.

21 Claims, 16 Drawing Sheets

Related U.S. Application Data continuation-in-part of application No. 13/754,457, filed on Jan. 30, 2013, now abandoned, which is a continuation of application No. 13/600,905, filed on Aug. 31, 2012, now abandoned.

(60) Provisional application No. 61/541,675, filed on Sep. 30, 2011.

(56) References Cited

U.S. PATENT DOCUMENTS

| | | | | |
|---|---|---|---|---|
| 8,554,814 | B2* | 10/2013 | Qi | G06F 7/588 |
| | | | | 708/255 |
| 8,930,429 | B2 | 1/2015 | Cert et al. | |
| 9,710,230 | B2* | 7/2017 | Pruneri | G06F 7/588 |
| 10,019,235 | B2* | 7/2018 | Nordholt | G06F 7/588 |
| 2005/0007666 | A1 | 1/2005 | Kuznetsov | |
| 2005/0019602 | A1 | 1/2005 | Sellinger | |
| 2008/0065710 | A1 | 3/2008 | Florentino et al. | |
| 2010/0217789 | A1 | 8/2010 | Saitoh et al. | |
| 2010/0332575 | A1 | 12/2010 | Kanter et al. | |
| 2012/0045053 | A1 | 2/2012 | Qi et al. | |
| 2012/0200422 | A1 | 8/2012 | Duncan et al. | |
| 2012/0221615 | A1 | 8/2012 | Cerf et al. | |
| 2013/0036145 | A1 | 2/2013 | Pruneri et al. | |
| 2013/0336651 | A1 | 12/2013 | Bato et al. | |
| 2015/0200778 | A1 | 7/2015 | Shi et al. | |
| 2016/0328211 | A1* | 11/2016 | Nordholt | H04L 9/0852 |
| 2017/0115960 | A1* | 4/2017 | Pruneri | G06F 7/588 |
| 2018/0239592 | A1* | 8/2018 | Nordholt | H04L 9/0852 |

OTHER PUBLICATIONS

Blum "Independent Unbiased Coin Flips from a Correlated Biased Source: A Finite State Markov Chain" Combinatorics; vol. 6; No. 2; pp. 425-433; 1985.

Carter, et al. "Universal Classes of Hash Functions" J. Comp. Sys. Sci.; vol. 18; pp. 143-154; 1979.

Dodis, et al. "Randomness Extraction and Key Derivation using the CBC, Cascade and HMAC Modes" Lect. Notes. Comp. Sci.; vol. 3152; 17 pages; 2004.

International Search Report and Written Opinion issued by the U.S. Patent and Trademark Office as International Searching Authority for International Application No. PCT/US16/43561 dated Nov. 18, 2016 (8 pages).

Krawczyk "LFSR-based Hashing and Authentication" Advances in Cryptology—CRYPTO '94; LNC; vol. 839; pp. 129-139; 1994.

L'Ecuyer, et al. "TestU01: A C Library for Empirical Testing of Random Number Generators" ACM Transaction son Mathematical Software (TOMS); vol. 33; No. 4; Article 22; pp. 1-40; Aug. 2007.

Martin, et al. "Quantum Random Number Generation for 1.25 GHz Quantum Key Distribution Systems" Journal of Lighwave Technology; vol. 33; No. 13; pp. 2855-2859; Jul. 1, 2015.

Stinson "Universal hash families and the leftover hash lemma, and applications to cryptography and computing" J. Combin. Math. Combin. Comput.; vol. 42; pp. 1-29; 2002.

Vazirani "Towards a Strong Communication Complexity theory or Generating Quasi-Random Sequences from Two Communicating Slightly-Random Sources" 15th Annual ACM Symp. on Theory of Computing; pp. 366-378; 1985.

Von Neumann "Various Techniques Used in Connection with Random Digits" Nat. Bur. Stand.; vol. 12; pp. 36-38; 1951.

Zhou, et al. "Streaming Algorithms for Optimal Generation of Random Bits" retrieved online from URL: https://arxiv.org/pdf/1209.0730v1.pdf; 13 pages; 2012.

Stipcevic, et al. "Quantum random number generator based on photonic emission in semiconductors" 2007; Review of Scientific Instruments; vol. 78; 7 pages.

You-Qi, et al. "68 Gbps quantum random number generation by measuring laser phase fluctuations" Jun. 2, 2015; Arxiv.org; Cornell University Library; Ithaca, NY; 14 pages.

* cited by examiner

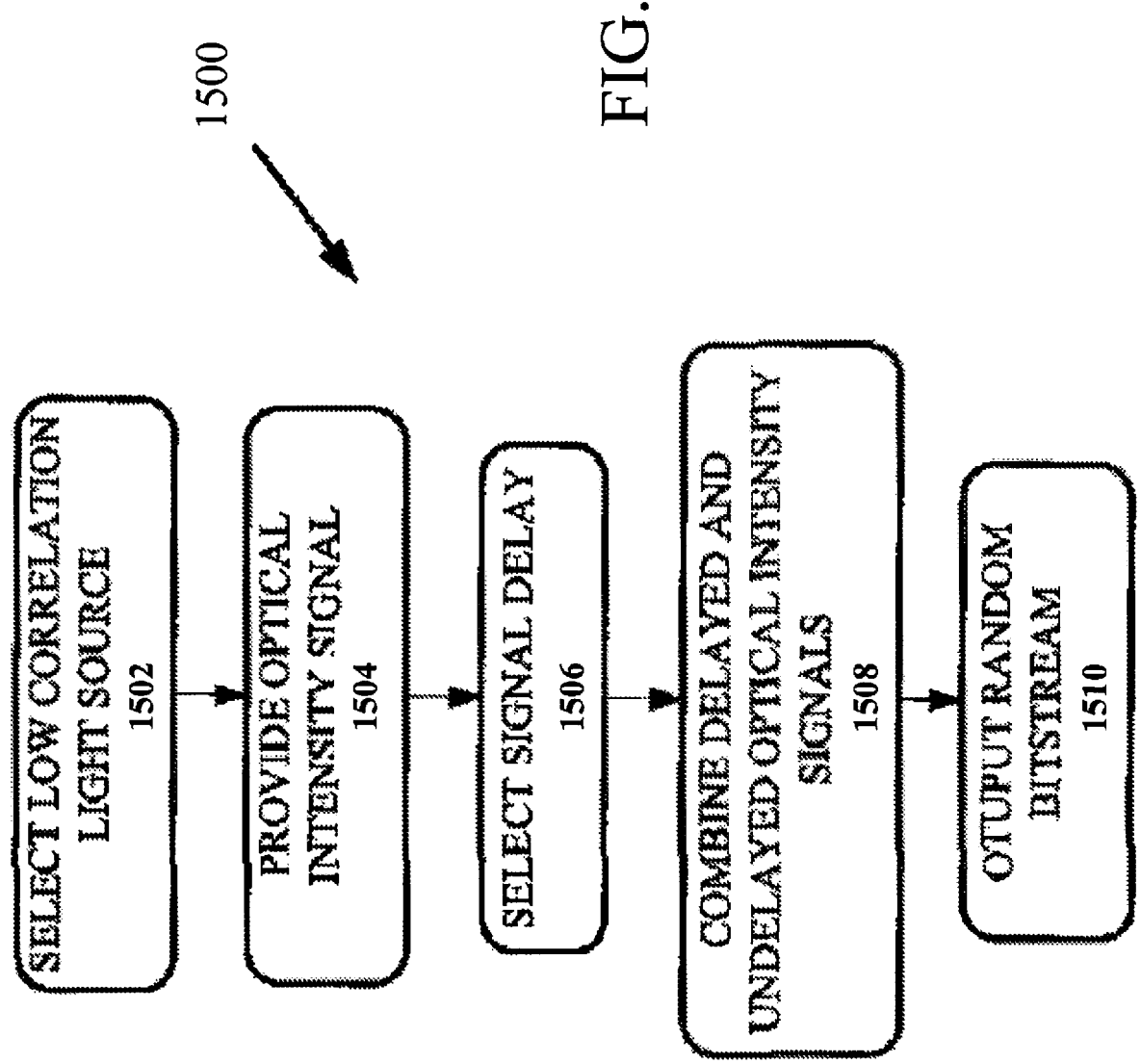

QUANTUM RANDOM NUMBER GENERATORS

CROSS REFERENCE TO RELATED APPLICATIONS

This application is a continuation of U.S. patent application Ser. No. 14/812,623, filed Jul. 29, 2015, and now U.S. Pat. No. 10,019,235, which is a continuation-in-part of U.S. patent application Ser. No. 13/754,457, filed Jan. 30, 2013, which is a continuation application of U.S. patent application Ser. No. 13/600,905, filed on Aug. 31, 2012, which claims the benefit of U.S. Provisional Application 61/541,675, filed Sep. 30, 2011, the contents of all of which are incorporated herein by reference.

ACKNOWLEDGMENT OF GOVERNMENT SUPPORT

This invention was made with government support under Contract No. DE-AC52-06NA25396 awarded by the U.S. Department of Energy. The government has certain rights in the invention.

FIELD OF THE INVENTION

The present invention relates generally to random number generators, and, more specifically, to random number generators that produce random numbers based on quantum phenomena.

BACKGROUND

Many applications of computer systems require access to a stream of random numbers. Typical applications include cryptography, gaming, and statistical sampling and analysis. Random number generators (RNG) have been based on various physical effects such as the thermal noise of electronic components, radioactive decay, and shot noise. Other RNGs are based on software approaches and can use timing of a computer user's movements as a basis for random number generation. Well-designed RNGs are generally able to provide long sequences of random numbers, but eventually the numbers produced are not completely statistically unrelated, and are more properly considered to be "pseudo-random." Conventional electrical circuit based RNGs that take advantage of thermal or shot noise can require excessive wafer area when implemented in an integrated circuit. In view of the above and the long standing need for random numbers, alternative approaches to random number generation are needed.

SUMMARY

The present disclosure is directed at quantum random number generators ("QRNG"). In some embodiments, the disclosed QRNGs can capture the irreducible unpredictability of quantum physics as exhibited in the intensity fluctuations of thermal light, which are rooted in the indistinguishability of photons, the elementary particles of light. The present disclosure is also directed at methods for facilitating a thermal light source's quantum randomness to dominate any classical noise in the QRNG, and providing output random bit streams that not only pass comprehensive statistical randomness tests, but also have the unpredictability (entropy) traceable to the quantum properties of the thermal light source. In some embodiment, a "basic" version of the QRNG is disclosed that is suitable for many applications requiring random numbers. In other embodiments, a cryptographic, full quantum entropy version of the QRNG is disclosed that is compatible with design standards for cryptographic true random number generators. The cryptographic version can include both self-test and fail-safe features. Both types of embodiments can be amenable to operation at ultra-high rates (many tens of Gbps), low-cost manufacturing, and small robust form factor with standard computer interfaces.

BRIEF DESCRIPTION OF THE DRAWINGS

For a more complete understanding of various embodiments of the present invention, reference is now made to the following descriptions taken in connection with the accompanying drawings in which:

FIG. 15 illustrates a method of random number generation, according to some embodiments.

DETAILED DESCRIPTION

Figure 1:
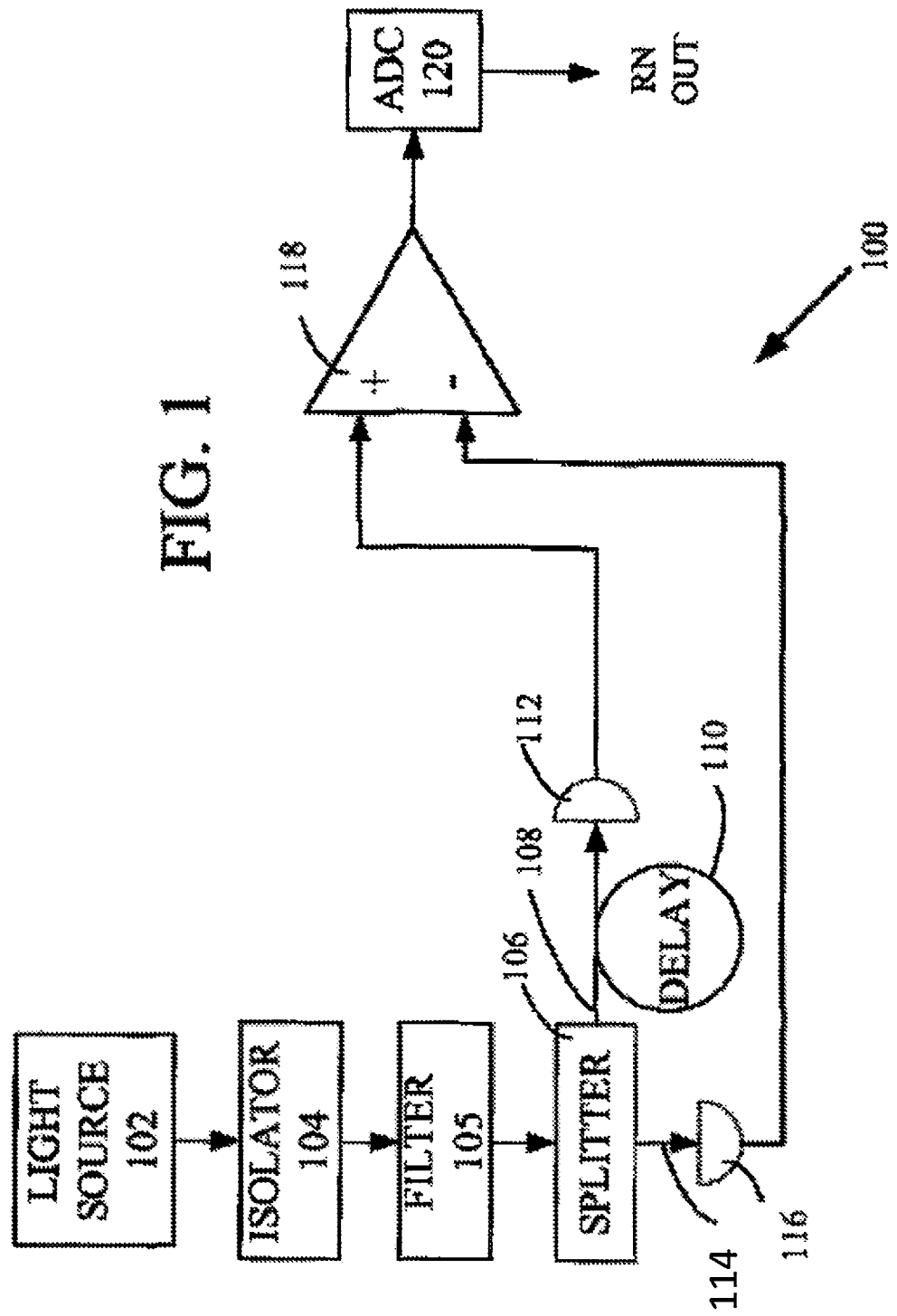
FIG. 1 is a schematic showing a random number generator (RNG) in which a detected intensity and an optically delayed detected intensity are directed to a comparator, according to some embodiments.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Random numbers are required in cryptography for many purposes, including: encryption keys, authentication keys, one-time signature keys, initialization vectors, random challenges, nonces, padding values, generation of public key parameters using randomized algorithms, and as input for quantum key distribution (QKD) systems. For cryptographic uses, random bits meeting the following requirements are desired:

The bits should be unpredictable. One way of quantifying the unpredictability of a bitstream is with the "entropy" of the stream. Entropy is a fundamental physical quantity, and can be a measure of the lack of determinism in a system. In information theory, the entropy of a stream of messages (sometimes called the "Shannon entropy") is a measure of the average amount of information required to specify each message. A bit stream that exhibits perfect randomness would exhibit one bit of entropy per bit. This condition is referred to herein and in the field as "full entropy."

The method of generating random bits should provide assurance that the amount of entropy exhibited by the random bits cannot be influenced by an adversary.

The method of generating random bits should comply with an accepted architecture and evaluation methodology.

The disclosed quantum random number generators (QRNGs) facilitate all three of these goals. The disclosed QRNGs and methods take advantage of the intrinsic unpredictability and thus entropy in quantum phenomena, and are especially desirable in the adversarial setting of cryptography for parameter generation: no adversary, today or in the future, can predict or influence quantum "noise." In this respect, the disclosed quantum RNGs are superior to other known RNGs that only produce "pseudorandom" bitstreams that are generated by entirely deterministic causal processes (e.g., using mathematical algorithms that generate sequences of pseudorandom bits based on an initial "seed" value). Although such pseudorandom bitstreams may pass standard statistical tests for randomness, the only entropy they possess is that of the bits used to seed the pseudorandom RNG, and exhibit much lower entropy per bit than truly random sequences of bits. A sequence of $10^{10}$ bits that was seeded with a single random bit only possesses 1 bit of entropy. In contrast, the disclosed quantum RNGs are true random number generators that use irreducibly unpredictable quantum effects to generate random bitstreams. Such bitstreams can have high entropy, and in some embodiments can exhibit 1 bit of entropy per bit (i.e., "perfect" randomness). In other words, a sequence of $10^{10}$ bits produced by the disclosed QRNGs can have $10^{10}$ bits of full quantum entropy—every bit is unpredictable even if all of the previous bits are examined. Although other true random number generators attempt to use a physical phenomenon to provide entropy, many of these systems are merely classically chaotic and not inherently unpredictable. Their apparent unpredictability comes from a lack of knowledge of the details of the previous state of the system, and does not stem from a fundamental lack of determinism. Only quantum phenomena and thus quantum random number generators (QRNGs) are truly unpredictable.

The disclosed RNGs and methods are also capable of providing random numbers with full quantum entropy at high rates. Unlike other known methods and apparatus, the disclosed quantum RNGs do not require single-photon detection or include classical noise contributions. In some embodiments, the disclosed QRNGs have been demonstrated to provide random numbers at rates of up to 44 Gbps. In typical examples, the disclosed QRNGs exhibit large quantum signal to classical noise ratios, and in some examples, differential detection is used to remove or reduce one of the biggest sources of classical noise pollution of random numbers by using common mode rejection. In addition, QRNGs as disclosed herein can be made compact and can be simple to manufacture.

Representative embodiments of random number generators are described below. These embodiments include light sources configured so as to produce random numbers based on the counter-intuitively large quantum-optical intensity fluctuations traceable to the quantum physics of photons as indistinguishable elementary particles obeying Bose-Einstein statistics. Examples of this property that can be harnessed for QRNGs include: intensity fluctuations in thermal light, such as black-body radiation; photon bunching in temporal photon streams; and so-called Hanbury Brown-Twiss intensity fluctuations that are produced by combining optical intensities (proportional to a square of the amplitude of an optical flux) or electrical signals associated with optical intensities.

Although quantum-optical intensity fluctuations have been understood since the quantum mechanics of black bodies were first examined in the early $20^{th}$ century (A. Einstein "Zum gegenwärtigen Stand des Strahlungsproblems" Phys. Zeitschrift 10, 185 (1909)), they were not applied as a scientific tool until Robert Hanbury Brown and Richard Twiss had the insight that these fluctuations in starlight (or in their experiments, stellar radio emissions) would be correlated at two different detectors until the detectors were sufficiently far apart that they were capable of resolving the disk of the star (moving the detectors farther apart increased their spatial resolution of the stellar images if atmospheric effects can be ignored). This is because an unresolved star is a spatial singularity or a single quantum mechanical spatial mode. Once the star can be resolved, more spatial modes are present and the intensity fluctuations from the different modes will be independent. Thus by moving two radio antennas farther and farther apart, a star's diameter could be directly measured by observing when the correlations in the intensity fluctuations of the two detectors fell off. For decades, this was the primary means of directly measuring the size of stars. As with Hanbury Brown and Twiss, the disclosed QRNGs harness the random intensity fluctuations in the radiation of thermal sources to generate random numbers, as discussed below.

Photons from a light source can exhibit bunching (intensity fluctuations) due to quantum mechanical effects. The reason for this is because at the atomic level, when photons are emitted from an atom or molecule, there is an associated electromagnetic field. When that field is "high" in a particular optical mode, the quantum-mechanical probability that other emitters will also emit into that mode is enhanced. Specifically and formally, photons within the same coherence time and wavelength are identical elementary particles called bosons. If there is already a photon present in a mode, more photons will want to join it. The more photons there are in a mode, the more likely it is that more photons will be emitted in that mode as well. This gives rise to "bunches" of photons that cause the intensity of a light source to fluctuate.

The temporal profile of quantum mechanical bunching (intensity fluctuations) can be completely random. In other words, when photons from a light source exhibit no memory between one unit of time to another, the presence (or absence) of an intensity fluctuation at one time does not affect the likelihood that there will be (or there will not be) an intensity fluctuation at another time. Each such unit of time can be expressed as a "coherence time" that is approximated by the breadth of wavelengths that the light source produces divided by the speed of light, c. In the exemplary embodiments disclosed herein, that coherence time is on the order of a few femto seconds. By exploiting the random appearance of "bunches" of photons, the disclosed random number generators can generate random numbers at high rates.

The coherence time sets the theoretical maximum speed at which the disclosed random number generators can generate random numbers. Using light sources that generate photons in a higher number of modes can allow the disclosed random number generators to generate random bitstreams at a faster rate, but will also split the photons being generated by the light source among a greater number of modes. Generally speaking, a larger number of photons per optical mode can be advantageous for increasing the amplitude of "bunches" of photons, thus increasing the signal-to-noise ratio of the generated quantum random numbers.

The disclosed QRNGs can use quantum-optical intensity fluctuations based on optical fluxes that are sufficiently large to reduce at least some noise effects, unlike randomness generation based on optical shot noise. Shot noise is a more commonly recognized quantum phenomenon because it involves the random choices of single photons. The difficulty is that single-photon detectors are inherently slow and expensive and because the signal-to-noise ratio of shot noise is inversely proportional to the square root of the average number of photons per sample, attempts to use larger numbers of photons for faster and cheaper random number generation results in a system that must detect very small fluctuations even with very few photons per sample (e.g. if there are on average 10,000 photons per sample the quantum fluctuations are only at the 1% level). This makes interference from classical noise difficult to reject.

However, if quantum-optical intensity fluctuations are used, single-photon detection is unnecessary. In the examples described below, optical fluxes of between about $10^3$ and $10^2$ photons/ns are convenient, and about $10^6$ photons/ns is typical. The signal-to-noise ratio of quantum-optical intensity fluctuations are dependent on the number of modes and if the mode number is constant, the signal-to-noise ratio is proportional to the number of photons. This makes it possible to have large signals and large signal-to-noise. As used herein, optical fluxes refers to propagating electromagnetic radiation in wavelength ranges from about 100 nm to about 10 μm. Other spectral ranges can be used, but optical detectors having electrical bandwidths of at least 10 MHz, 100 MHz, 1 GHz or higher tend to be readily available in the above mentioned ranges. Electrical signals corresponding to optical fluxes can be associated with time-varying electrical voltages, currents, or combinations thereof produced with one or more photodetectors. For convenience, such signals can be referred to as detector signals and are proportional to optical intensities. Photodetector signals as used herein thus refer to signals produced by or corresponding to so-called "square law" detection.

Combining a photodetector signal produced in response to an optical intensity with a suitably delayed version of the same photodetector signal (i.e., delayed so as to reduce or eliminate correlations) can improve the quality of random fluctuations. The time delay can be determined by the coherence time of the optical source (which can be femtoseconds or less) and the bandwidth of the electronics (which can be on the order of 1-10 GHz). If the delay is beyond these time scales, the delayed signal can be independent of the undelayed signal. This gives a means of removing undesirable features such as power supply drifts that slowly change the overall signal levels and in some electronic designs which might cause biases (e.g., more 1s than 0s) in the output bits. In the disclosed examples, delays of between about 10 ns and 10 μs are generally satisfactory, but delay can depend on source and electronics properties. These random fluctuations can be used to produce random numbers as disclosed below. For some light sources, the production of spectral features introduced by coupling light source optical fluxes into fibers and other optical components is preferably avoided. Accordingly, optical isolators are used with some embodiments and with some light sources. For example, reflections of an optical flux back toward a source can introduce resonances that increase optical flux coherence which is undesirable in random number generation.

A variety of thermal light sources can be used. As used herein the term "thermal light source" or "thermal light"

refers to light that has one or more optical field modes that are populated with photons according to a Bose-Einstein probability distribution of photon number (as opposed to chaotic light that can have a normal distribution of photon number). Examples of thermally-distributed optical sources include blackbody radiation from a hot filament (e.g. an incandescent light bulb), light-emitting diodes (LEDs), and suitably-configured electrically-pumped semiconductor optical amplifiers (SOAs) as well as optically-pumped optical amplifiers.

Figure 16A:
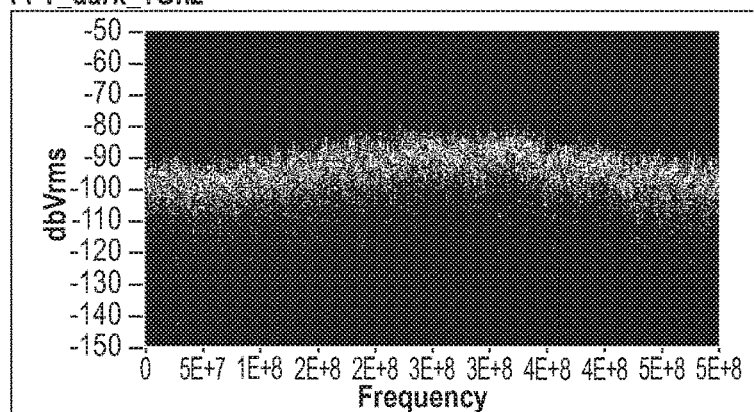
FIGS. 16A-16D illustrate spectra of electrical signals associated with light source intensity for a variety of sources.
Figure 16B:
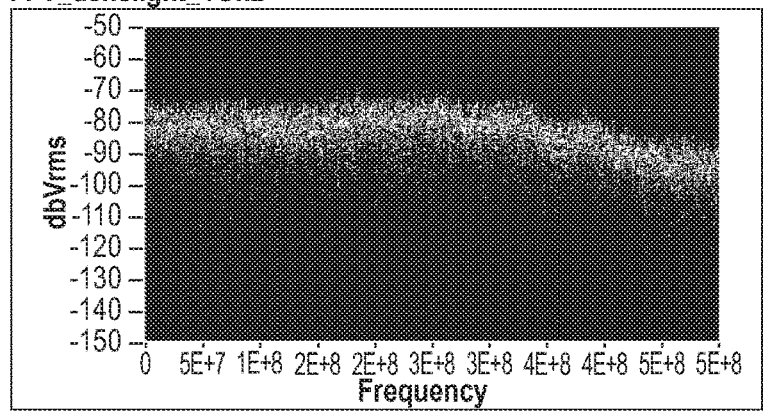
Figure 16C:
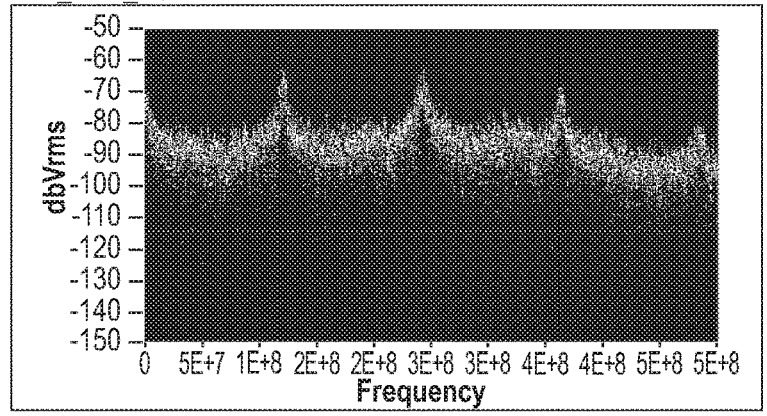
Figure 16D:
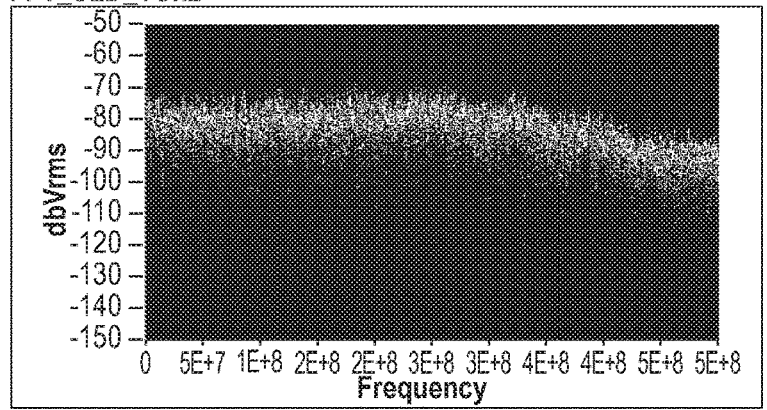

An ideal optical light source should possess several properties. One desired characteristic of an ideal optical light source is that it exhibit low optical intensity correlation. FIGS. 16A-16D illustrate spectra of the optical intensities of various sources. FIGS. 16A, 16B and 16D are associated with sources expected to perform satisfactorily in random number generation, while the spectral features of FIG. 16C indicate that the associated source may exhibit unsatisfactory coherence properties, and be unsuitable.

It can also be advantageous to use a light source that maximizes the number of photons emitted per optical mode. Controlling the number of modes can be important for ensuring that the resulting bitstream has high entropy that is derived from quantum fluctuations (which is more desirable because these fluctuations are fundamentally unpredictable and cannot be influenced by an adversary), as opposed to classical noise (which is less desirable because classical noise can be influenced by an adversary, or even from ambient conditions, such as RF from a local TV station or power supply noise). Light can be completely specified by its spatial, spectral (wavelength) and polarization modes, and the number of photons occupying each mode: no other labels are necessary, or even possible. Spatial modes can be thought of as having two types: longitudinal modes (also referred to as "temporal" modes) and transverse modes. Longitudinal modes are associated with degrees of freedom in the direction of propagation of light, whereas transverse modes are associated with directions transverse to the direction of propagation. If a thermal light source only has one mode (both longitudinal and transverse), any quantum fluctuations will vary over 100% of the light source's intensity. In this case the thermal nature of the light may be verified by measurement of its second-order degree of temporal coherence. This quantity, known as $g^{(2)}(\ )$, is formed from the product of two optical intensity measurements offset in time by. (See, for example, R. Loudon "The Quantum Theory of Light" $2^{nd}$, Ed., OUP, Oxford 1983.) It may be thought of as the analog in the temporal domain of Hanbury Brown Twiss correlations, and has the value 2 at zero time-delay ($g^{(2)}(0)=2$) for single-mode thermal light. However, if a thermal light source has multiple modes (either longitudinal or transverse), all of which are fluctuating independently, any detector that detects light from this light source will see a smaller fluctuation around an average. Therefore, ensuring that photons from the light source are concentrated in as few optical modes as possible can be advantageous for facilitating detection of quantum fluctuations.

The number of longitudinal modes that a detector is sensitive to the sampling rate of the detector, which can be adjusted by modifying the hardware or software of the detector. The number of transverse modes can also be influenced by applying a spatial mode filter to the output of a light source, such as a single-mode optical fiber, to screen out all photons other than photons in a particular selected transverse mode (or small set of transverse modes).

However, diminishing the number of longitudinal or transverse optical modes, such as by using a spatial filter to limit the number of transverse modes, can also diminish the optical power of a light source. Diminishing the optical power of a light source can make it more difficult for detectors to detect fluctuations. This is especially true when attempting to detect fluctuations at high rates, as high-speed optical detectors typically require higher optical power. There is therefore a tradeoff between minimizing the number of optical modes and maintaining high optical power to facilitate high-speed detection of quantum fluctuations. If photons are spread over too large a number of transverse or longitudinal optical modes, quantum fluctuations will become a relatively small part of the observed fluctuations in the optical signal, and instead classical fluctuations (e.g., from power supply variations, influences from local RF conditions, etc.) can dominate. The entropy in the resulting bit stream produced from such a light source will therefore no longer be dominantly "quantum" in origin. The ideal light source would therefore produce a large number of photons in a relatively modest number of modes.

The disclosed QRNGs represent an improvement over prior known allegedly "quantum" RNGs by selecting appropriate light sources that produce a large number of photons in a relatively modest number of transverse modes. In some embodiments, semiconductor optical amplifiers (SOAs) can serve as useful light sources as they fulfill many of the criteria described above. In a semiconductor optical amplifier (SOA) an input optical signal experiences gain through coherent addition of photons through stimulated emission, resulting in a larger optical signal at the output. In the absence of an input signal, the fundamentally quantum phenomenon of spontaneous emission within the gain region occurs, producing an output generically known as amplified spontaneous emission (ASE). Because photons in any given field mode are identical, indistinguishable elementary particles obeying Bose-Einstein (BE) statistics, the number of ASE photons in each mode in these circumstances is well-known to be thermally-distributed. Further, the optical structure of an SOA ensures that only a few transverse field modes are populated, single-mode for the present disclosure, leading to a large mean photon occupation number per mode. This in turn leads to the large amplitude, rapid, random fluctuations in photon occupation number, known as photon bunching, that are characteristic of Bose-Einstein statistics. These large fluctuations arise from the quantum-mechanical enhancement for the probability of a photon to be emitted into a field mode that is already populated with photons, which holds for bosonic elementary particles. In contrast, distinguishable particles obeying classical statistics, would exhibit only the much smaller statistical fluctuations in occupation number known as shot noise. The random BE fluctuations in thermal light from an SOA can be much larger than the electronic noise in a detection circuit, making this an excellent optical source of quantum randomness for use with the RNG described in present application. Long sections of optically-pumped single-mode optical fiber (several meters) doped with rare-earth elements are often used as sources of ASE, but are not amenable to miniaturization. In contrast, SOAs are commercially available, electrically-pumped chip-scale devices that are typically on the order of 1 mm$^3$ in volume, and could readily be integrated into an extremely compact RNG device. In some embodiments, SOA light sources may be constructed using wafers with desirable gain and noise reduction characteristics, formed from materials such as, e.g., Indium Gallium Arsenide Phosphide (InGaAsP). In other embodiments, adequate performance may be obtained using a SOA from a "scrap" wafer, which may reduce production costs. While the currently disclosed QRNGs can operate with both optically-pumped and electrically pumped thermal light sources, electrically pumped light sources can be easier and cheaper to manufacture and setup, exhibit smaller device sizes, and exhibit greater robustness.

SOAs can be configured either as dual- or single-polarization SOAs. Dual-polarization SOAs emit light having two distinct polarization modes by using a waveguide with a square cross-section. A single-polarization SOA, on the other hand, emits light having only one polarization mode by using a waveguide having a cross-section shaped like a thin rectangle. For a given electrical input power, both types of SOAs will output roughly the same optical power, but the dual-polarization SOAs will split the same number of photons across twice the number of modes as a single-polarization SOA. As a result, single-polarization SOAs can produce light that has a higher photon-to-mode ratio, which is desirable for the reasons discussed above. If random fluctuations are intended in a time period $\Delta t$, then the source spectral frequency width $\Delta v$ satisfies $(\Delta t \times \Delta v) \approx 1$. For fluctuations at about 5 GHz, a spectral (wavelength) width of 13 pm or more is preferred.

In some embodiments, an LED may be used as a light source for a quantum RNG. Unlike the filament of a light bulb that radiates over large areas and at all angles, an LED limits the number of modes into which it radiates by its geometry. To reduce the number of transverse optical modes produced by an LED, it can be advantageous to filter the LED's output with a spatial mode filter such as a multi-mode or a single-mode optical fiber to screen out extraneous modes. Single-mode LEDs that use quantum dot technology can also be used as light sources in some embodiments—such LEDs have the added advantage of producing light in a single mode only (and therefore do not require a spatial mode filter). Using an LED light source may also reduce the overall cost of the system, as LEDs are relatively inexpensive light sources.

Using spatial mode filters other than multi-mode and single-mode optical fibers may also reduce production costs. Filtering using optical fibers requires aligning the filter with the light source using a process called "butt-coupling," a delicate procedure that can be expensive. Instead of optical fibers, a bather with one or two pinholes may be inserted between the light source and the detector. The pinholes in the barrier would then act as a spatial mode filter, screening out all but a handful of spatial modes. A detector with a small active area can also act as a pinhole to limit the number of spatial modes.

Lasers that are run below threshold (such that they no longer function as lasers) can also serve as a low-cost light source. Vertical Cavity Surface Emitting Lasers (VCSELs) are examples of such low-cost lasers would be used in such embodiments.

In some embodiments, the photodetector may be a photodiode that operates at a relatively short wavelengths at relatively low rates. Such photodiodes are less expensive than photodiodes that operate at longer wavelengths (e.g., "telecom" bands) and higher rates.

By using a light source with a large mean photon occupation number per field mode, the random quantum fluctuation signal can be much larger than the classical electronic noise in the detection circuit. The resulting large quantum signal-to-noise (QSN) ratio means that the present RNG can produce robust, high-rate, full-entropy output, traceable to the quantum noise of the light source after digitization and conditioning (e.g., the optical fluctuations can be turned into numbers by electronic digitization, and then any non-random artifacts such as bias or correlations introduced by the electronics can be removed by conditioning algorithms). The exemplary embodiments discussed herein include light sources that produce, or are filtered to produce, photons in a single transverse mode only. However, other embodiments use light sources that produce, or are filtered to produce, photons in more than a single transverse mode. In some cases, using light sources that produce photons in more transverse modes, or using a less discriminating filter that allows multiple transverse modes, can achieve suitable performance while reducing the production cost of the system as a whole.

Some embodiments may use light sources that exhibit one or more additional characteristics. For example, a preferred light source would have a spectral bandwidth of several THz (corresponding to several tens of nanometers for visible or near-infrared light). Some preferred light sources may also operate in the 1550-nm wavelength region, which would permit the use of commercial high-speed telecom optical and electronic components. Also, some embodiments may use compact light sources that consume relatively little power. Various types of light sources exhibit some or all of these characteristics (e.g., SOAs and LEDs).

FIG. 1 is a block diagram showing a random number generator (RNG) 100, according to some embodiments, that is based on comparison of uncorrelated optical intensities. Light source 102 such as an LED, a single- or dual-polarization SOA, or other light source is coupled via optical isolator 104, such as angled fiber terminations, which is used to prevent back reflections into the source 102, and optical filter 105 to beam splitter 106. Beam splitter 106 may be implemented using, e.g., a fiber coupler, a prism beam splitter, or any other type beam splitter known in the art. Beam splitter 106 produces a first output flux 108 that propagates to an optical delay 110 and a first optical detector 112. Beam splitter 106 also produces a second output flux 114 that is directed to a second detector 116. The optical delay 110 can be provided by an optical fiber. The magnitude of the optical delay may be adjusted as needed to ensure that correlations in detected optical signals are sufficiently attenuated.

Detectors 112, 116 are configured to produce electrical signals such as time-varying voltages or currents proportional to optical intensities and these signals are coupled to comparator 118 (which may be implemented using various types of difference circuitry or processor known in the art). In some embodiments, additional photosignal amplifiers, buffer amplifiers, and other processing components (not shown in FIG. 1) can be used to prepare the photosignals for coupling to the comparator 118. Comparator 118 produces a difference signal associated with a difference between the first and second photosignals, which is then passed to analog-to-digital converter 120, which converts the difference signal into a series of random bits.

Figure 2:
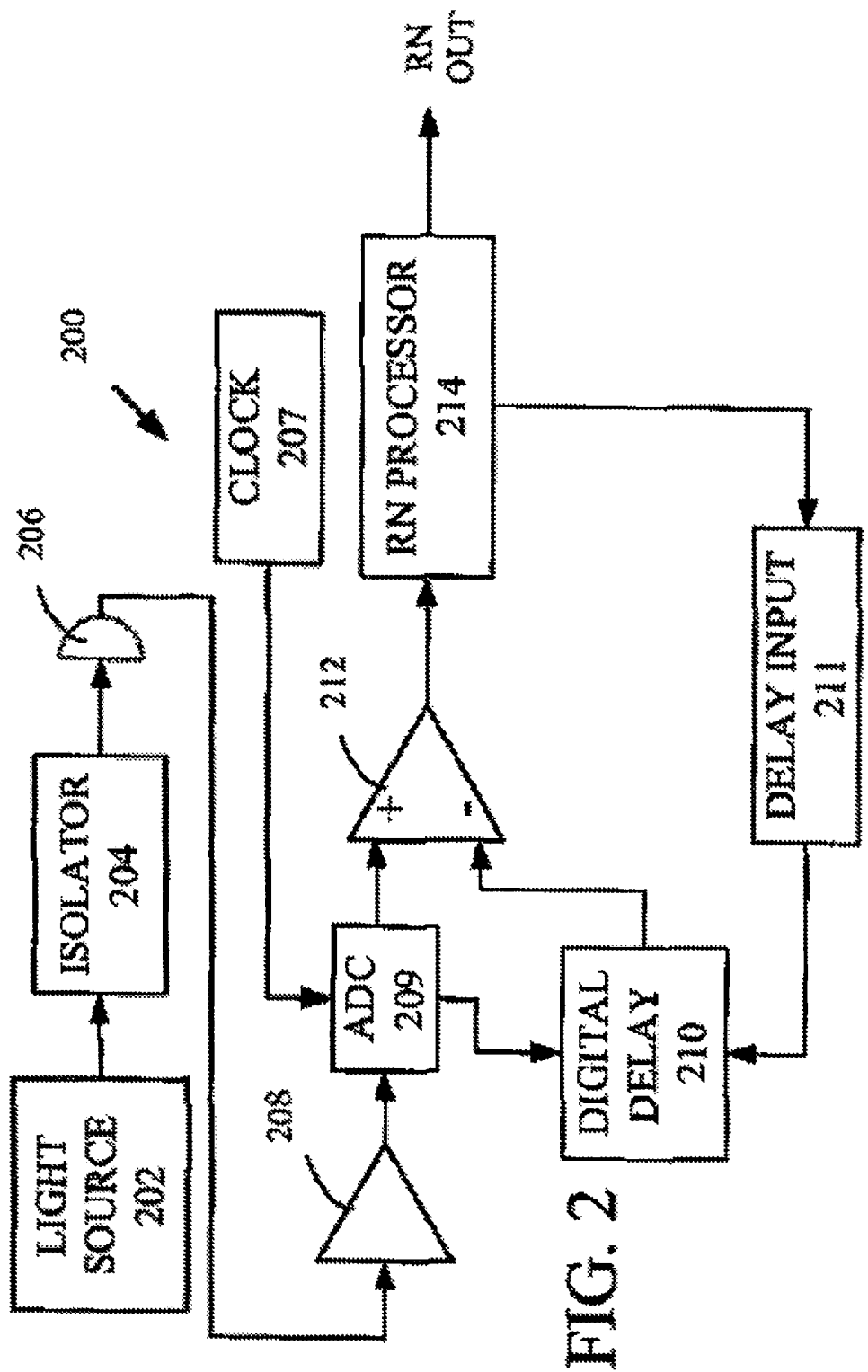
FIG. 2 is a schematic showing a random number generator in which a detected intensity and a digitally delayed detected intensity are directed to a comparator, according to some embodiments.

In some embodiments, optical delay 110 is replaced by digital delay 210. As shown in FIG. 2, a light source 202 produces an optical flux that is passed through isolator 204 to detector 206. An electrical signal corresponding to the detected optical flux at the detector 206 is coupled to buffer amplifier 208 which is in turn coupled to an analog to digital converter (ADC) 209 that produces two bitstreams at a rate determined by clock 207. One of these bitstreams is passed directly to comparator 212, while the other is delayed by digital delay 210 before it is received by comparator 212, which produces a difference signal that is then processed by Random Number (RN) processor 216. RN processor 216 may, e.g., partition the input bitstream into words, apply compression to the input bitstream, and measure the amount of entropy contained in the input bitstream.

In some embodiments, digital delay 210 can provide a variable or selectable delay based on correlations in the intensity of the optical flux received at detector 206. In some examples, correlations between delayed and undelayed buffer amplifier outputs are associated with characteristics of buffer amplifier 208, detector 206, and/or the bandwidth of other electronic elements such as amplifiers. For example, a detector can exhibit a long transient associated with exposure to an input so that delayed and undelayed electrical signals are at least somewhat correlated, which would reduce the amount of entropy in the overall output of the RNG. By providing a variable digital delay, this can be avoided. As shown in FIG. 2, RN processor 214 may set an appropriate delay using delay input 211, which in turn controls the delay provided by digital delay 210.

Figure 3:
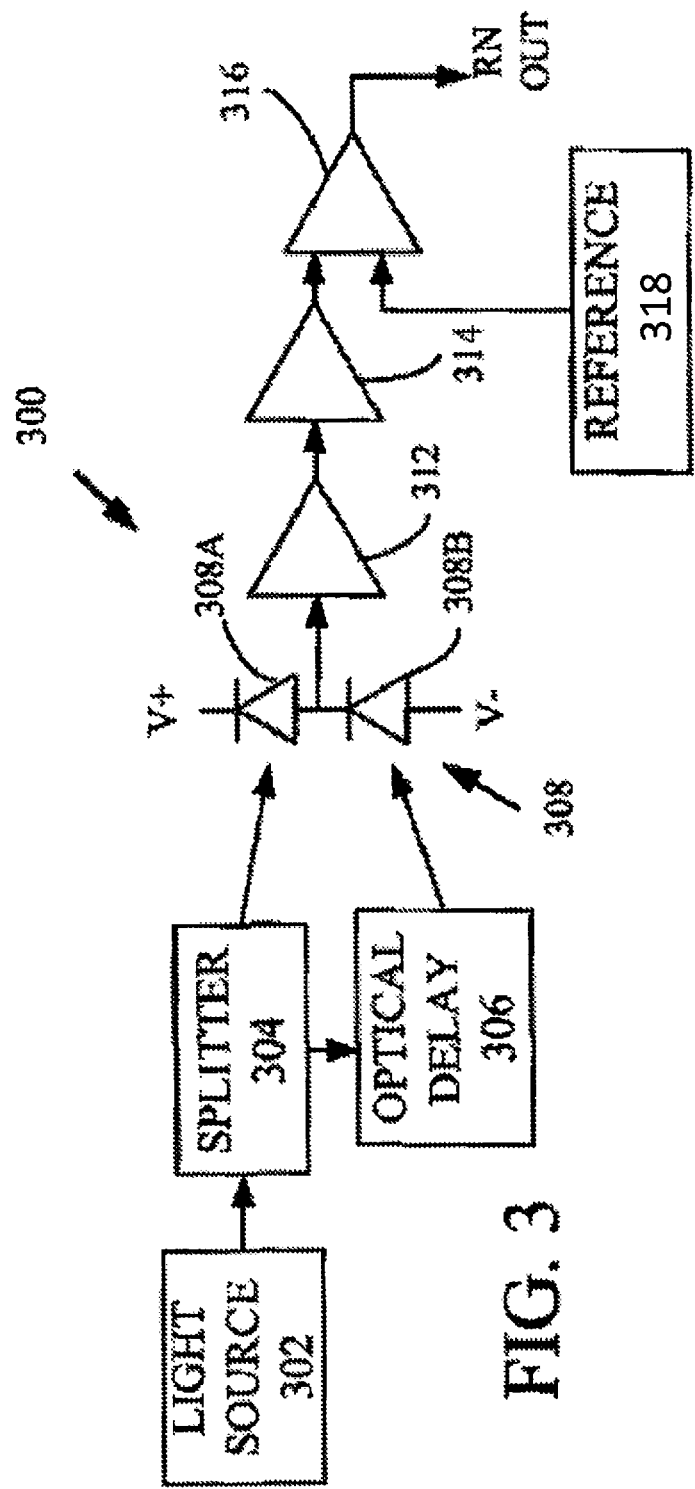
FIG. 3 is a schematic showing a random number generator in which balanced detectors are coupled to produce a detected intensity and an optically delayed detected intensity that are directed to a comparator, according to some embodiments.

With reference to FIG. 3, random number generator (RNG) 300 may include a light source 302 that is optically coupled to an optical power splitter 304 such as an optical fiber based coupler or a bulk optical beam splitter. Typically, reflected optical power is substantially prevented from returning to the light source 302 with optical isolator 104, as shown in FIG. 1, or using any other means of preventing back reflections. Splitter 304 includes at least two optical outputs so that portions of the optical power received by splitter 304 are directed to a first detector 308A of a balanced detector pair 308 and an optical delay 306, respectively. An output of the optical delay 306 is coupled to a second detector 308B of the balanced pair 308. As shown in FIG. 3, the first detector 308A and the second detector 308B are configured as a balanced detector pair, which serves to partially suppress classical amplitude noise and other classical variations in the optical power of the light source 302. While balanced detectors are not required, they generally exhibit superior suppression of common mode noise, and thus tend to produce corresponding electrical signals that may exhibit greatly reduced correlation that persists over times greater than about 1 ns, 10 ns, 100 ns, 1 µs, 10 µs, or 100 µs (depending on the light source used).

The balanced detector output is provided to amplifier 312 such as a transimpedance amplifier that is coupled to buffer amplifier 314 and then to comparator 316. If desired, the comparator 316 can be provided with a reference voltage by a reference source 318. A comparator output can be used to obtain a random bit sequence.

Figure 4:
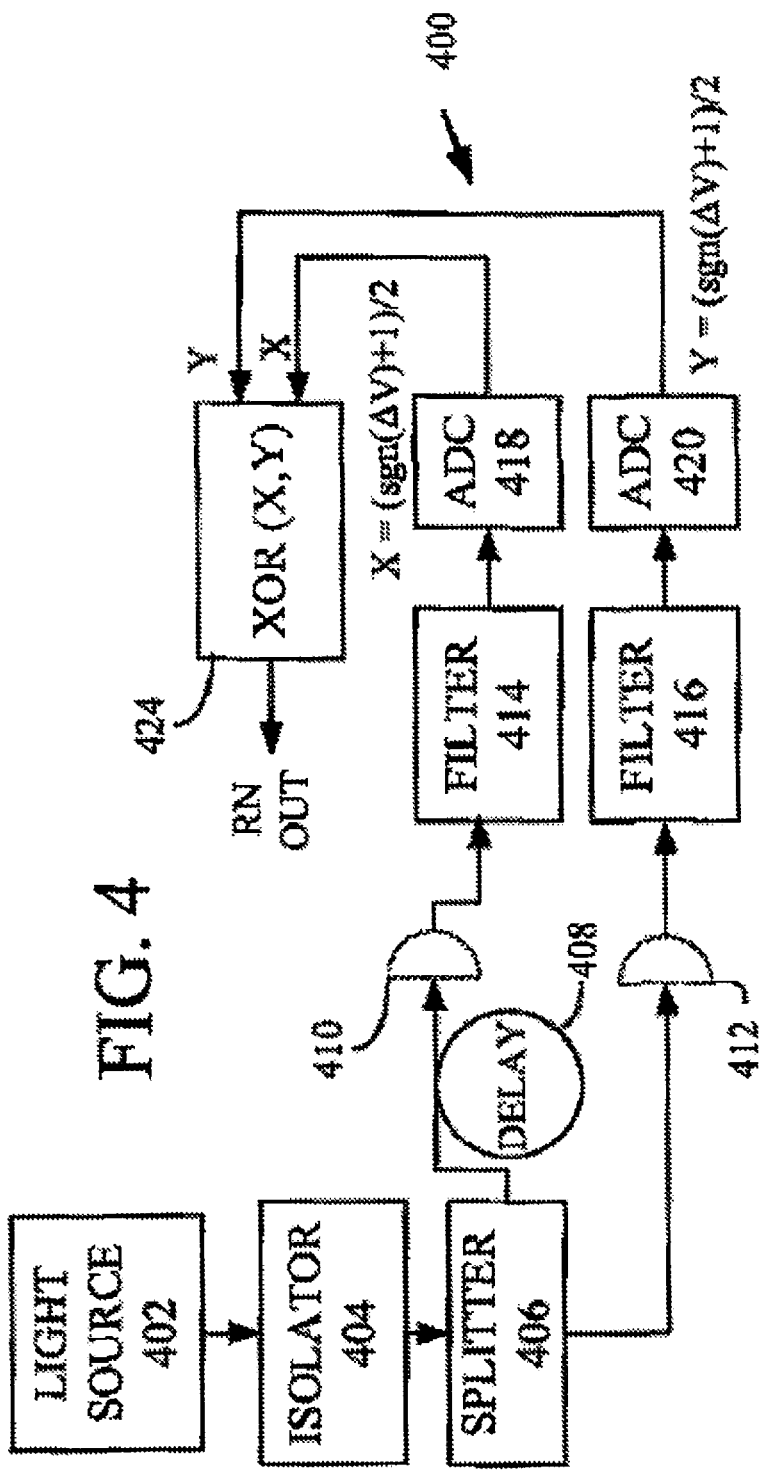
FIG. 4 is a schematic showing a random number generator in which a detected intensity and an optically delayed detected intensity are filtered or smoothed and then combined, according to some embodiments.

In another example illustrated in FIG. 4, a RNG 400 includes a light source 402, an isolator 404, and an optical fiber coupler 406 that is configured to couple a first portion of an optical flux produced by the light source 402 to a fiber delay 408 and a first detector 410, and a second portion to a second detector 412. Output electrical signals from the detectors 410, 412 can be coupled to respective filters 414, 416 and analog to digital convertors (ADCs) 418, 420. The ADCs 418, 420 are configured to produce respective bits X, Y as (sgn(ΔV)+1)/2, wherein ΔV is a filter output voltage fluctuation. The bit outputs X, Y are coupled to combination processor 424 that can be implemented in hardware or software so as to combine X and Y as desired. For example, the processor 424 can be configured to determine a selected logical combination of X and Y such as, for example, a bit-wise exclusive XOR of X and Y but other combinations can be used. For example, for output voltage fluctuations ΔV₁ and ΔV₂ associated with first and second detectors, respectively, the following combination provides satisfactory results:

$$\{\mathrm{sgn}[\Delta V_1(0) - \Delta V_2(t)] + 1\}/2$$

where sgn is a sign function. If a single detector is used so that only a single voltage fluctuation $\Delta V_1$ is available, the combinations above produce satisfactory results by replacing $\Delta V_2(t)$ with $\Delta V_1(t)$.

Figure 5:
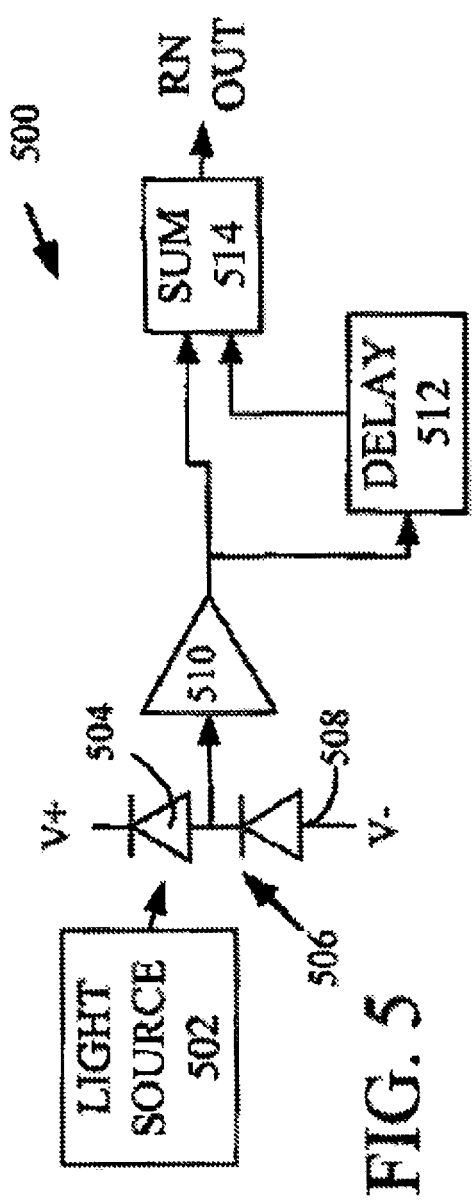
FIG. 5 is a schematic showing a random number generator in which an intensity detected by a first detector of a pair of balanced detectors and an electrically delayed detected intensity are directed to a comparator, according to some embodiments.

Yet another representative RNG 500 is illustrated in FIG. 5. A light source 502 produces an optical flux that is directed to a first detector 504 of a balanced detector pair 506, while a second detector 508 remains unexposed to the optical flux. As shown in FIG. 5, the detectors 504, 508 are photodiodes that can be selected based on the spectral content of the light flux produced by the light source 502, and silicon, germanium, and InGaAs photodiodes such as avalanche photodiodes (APDs) or PIN (p-i-n) photodiodes are often convenient. An electrical signal corresponding to the balanced pair output is coupled to a buffer amplifier 510, and portions of the buffered output are delivered to a summing node 514 directly and via a delay 512 to provide a random output bitstream.

Figure 6:
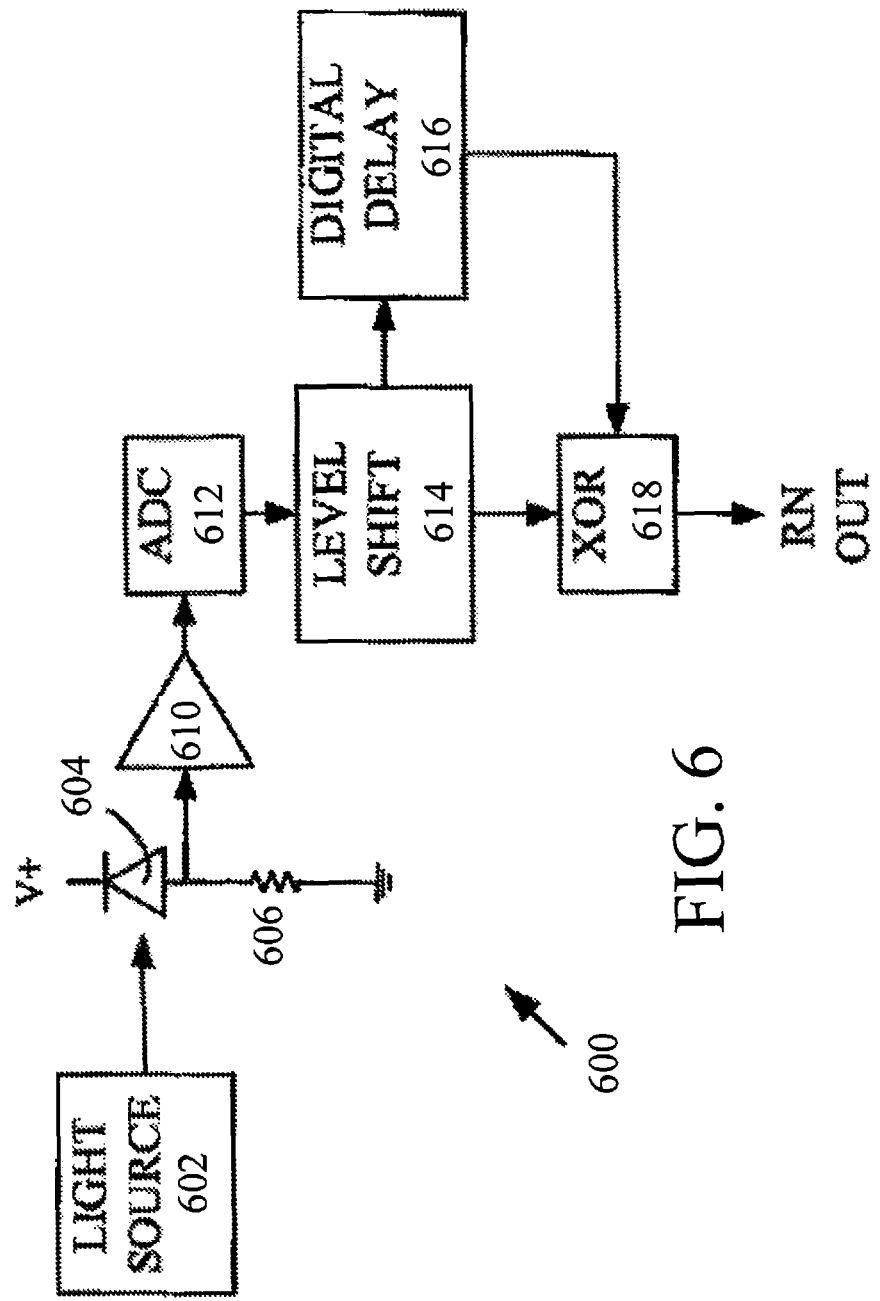
FIG. 6 is a schematic showing a random number generator in which detected intensity is digitized, and digitally delayed, and digitized intensity signals are combined, according to some embodiments.

With reference to FIG. 6, a random number generator 600 includes a light source 602 such as an LED that is configured to direct optical radiation to a photodetector 604. As shown in FIG. 6, the photodetector 604 is a reverse biased photodiode coupled in series with a resistance 606 but other photodetector configurations and bias arrangements can be used. An electrical signal produced by the photodetector 604 is amplified or buffered by a buffer amplifier 610 whose output is directed to an analog to digital convertor 612 that produces a digitized photosignal. The digitized photosignal is level shifted at 614, and digitally delayed (typically in software or firmware) at 616, and combined with the undelayed (or differently delayed) level shifted, digitized photosignal at an XOR 618 to produce a random bit string. Representative implementations of RNGs such as shown in FIG. 6 can produce random bits at rates of 5 Gb/s or more.

Figure 7:
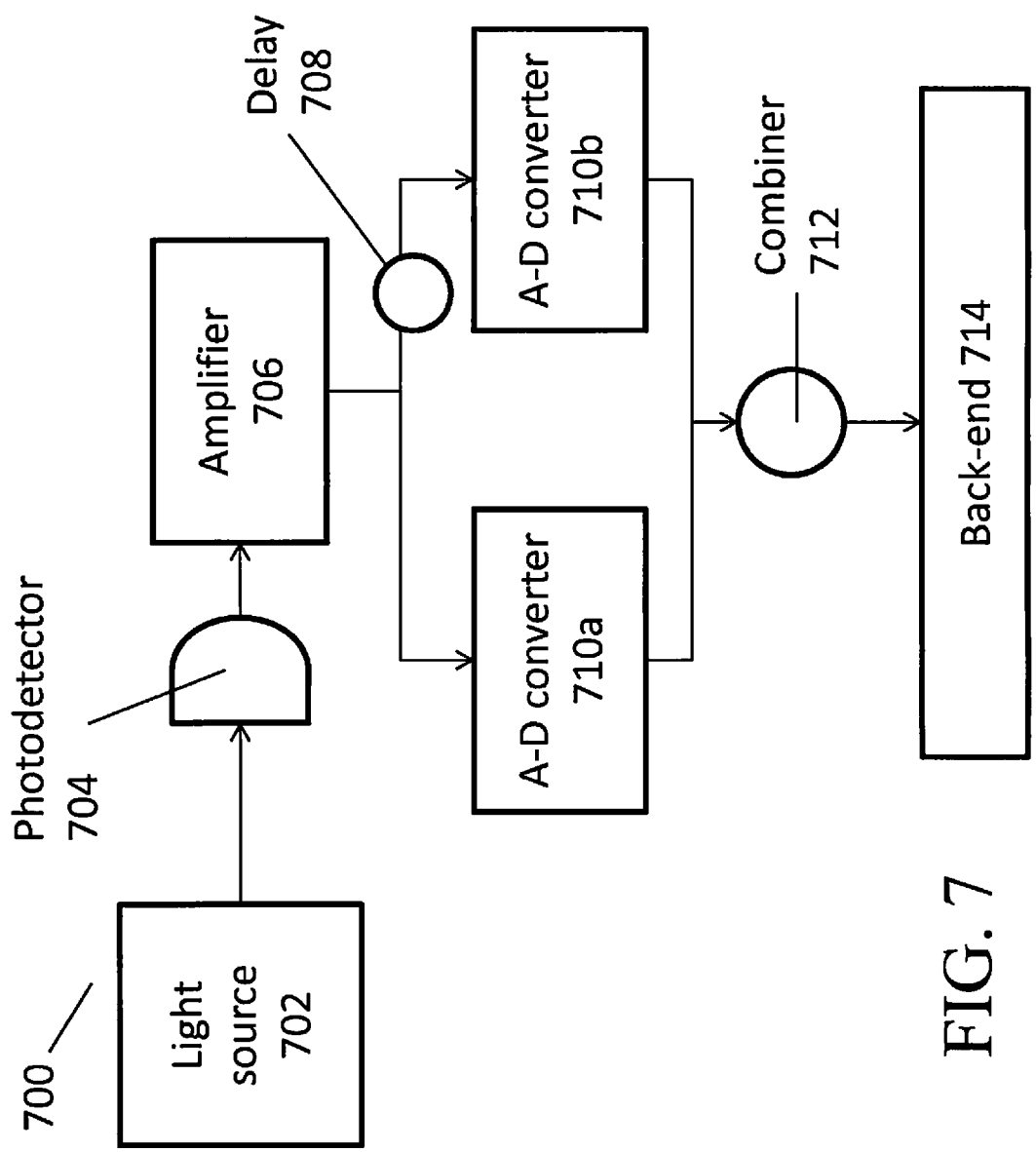
FIG. 7 is a schematic showing a random number generator in which detected intensity is digitized, and digitally delayed, and digitized intensity signals are combined, according to some embodiments.

FIG. 7 illustrates another embodiment of a random number generator 700. FIG. 7 includes a light source 702, a photodetector 704, an amplifier 706, A-D converters 710a and 710b, delay module 708, combiner 712, and back-end 714.

The light source 702 can be a thermal light source, and can include any of the types of light sources discussed herein, including single or dual-polarization SOAs. The output of light source 702 can be sent to a photodetector 704, which outputs an RF signal in response to the detected light. Light source 702 can be coupled to photodetector 704 via free-space, optical fiber, or other means including methods to restrict transverse mode number. Photodetector 704 preferably possesses high bandwidth (capable of GHz bandwidth) as well as a flat frequency response (e.g., is substantially equally sensitive to most or all of the wavelengths emitted by light source 702 and the spectrum of its fluctuations). The RF signal from photodetector 704 can be sent to an amplifier 706 that amplifies the RF signal. In some embodiments, amplifier 706 can be a transimpedance amplifier. In other embodiments, amplifier 706 can comprise one or more linear amplifiers connected in series. In choosing an appropriate amplifier 706, it can be important to find an amplifier that has a substantially flat RF response (e.g., that amplifies signals relatively equally across different RF frequencies). Using linear amplifiers can be advantageous as they tend to have RF responses that are relatively flat. Linear amplifiers can have lower gain compared to transimpedance amplifiers, but this can be compensated for by connecting two or more linear amplifiers in series.

The RF output from amplifier 706 can then be split into two streams using, for example, an electronic splitter. One stream can be passed directly to analog-to-digital (A-D) converter 710*a*. The other stream can be passed to A-D converter 710*b* via an analog delay module 708. The delay module 708 can be implemented in hardware and can delay the signal by approximately 7 ns, although longer or shorter delays are also possible. In some embodiments, delay module 708 can delay the signal by 0s (e.g., no delay at all). In other embodiments, delay module 708 can be reconfigurable to delay the signal by a variable time, including zero seconds, depending on hardware and/or software settings, or depending on any bias or correlations detected in random number generator 700's output. Preferably, delay module 708 is configured to produce sufficiently independent inputs into the combiner 712, described below, or other processing system.

As depicted in FIG. 7, delay module 708 is located upstream of A-D converter 710*b* and is therefore an analog delay module. In other embodiments, another, separate digital delay module (not pictured) can be inserted between A-D converter 710*b* and combiner 712. Such a digital delay module can also delay the signal so as to produce sufficiently independent inputs into the combiner 712, described below, or other processing system. As with delay module 708, digital delay module can possibly be reconfigured to delay the signal by a variable time, including zero seconds. Unlike delay module 708, however, this digital delay module can be configured to delay a digital signal instead of an analog signal.

In some embodiments, A-D converters 710*a* and 710*b* can be one-bit digitizers that function as comparators, e.g., if the RF signal is above a certain threshold, the A-D converters can output a logic high, and otherwise, the A-D converters can output a logic low. The A-D converters can be configured to record data at the rising or falling edge of a system clock. The outputs of both A-D converters 710*a* and 710*b* can then be sent to a combiner 712. In some embodiments, combiner 712 can be a simple XOR function, although other types of combiners are also possible. The output of combiner 712 can be a substantially random bitstream having high entropy, wherein the entropy contained therein is quantum in origin (as opposed to from classical noise). Statistical tests conducted on the output of combiner 712 indicate that this configuration can yield bitstreams that are at least 99.7% quantum-mechanically random (i.e., a bitstream with 0.997 bits of quantum entropy per bit of output). This is not a theoretical maximum, however, and it is likely that QRNGs of this type are capable of producing approaching full quantum randomness (i.e., one bit of quantum entropy per output bit), depending on the components used. Tests of randomness can be applied to the output of combiner 712 before any post-processing, in compliance with the requirements of the NIST (National Institute of Standards and Technology) SP800-90B draft standard (which requires that tests of randomness be passed prior to any algorithmic processing steps, lest the processing obscure flaws in the hardware output).

The output of combiner 712 can optionally be provided to a back-end 714 that applies a Secure Hash Algorithm (SHA), such as SHA512, to the output, which can make the output compliant with the NIST (National Institute of Standards and Technology) SP800-90B draft standards. Applying a SHA 512 can add defense-in-depth and thus enhance the security of the disclosed random number generator. In some embodiments, back-end 714 can be implemented as a field programmable gate array (FPGA). Back-end 714 can also be configured to provide the bitstream in a form that can be easily interfaced with a standard computer system. Additionally, back-end 714 can implement a call function that can be called by a computer system, such as a server or a personal computer. When the computer system sends a "call" signal to back-end 714, back-end 714 can respond by sending random numbers back to the calling computer system. With sufficiently fast electronics (e.g., with photodetectors, amplifiers, A-D converters, combiners, and/or back-ends with sufficient bandwidth), the disclosed random number generator has been shown to be capable of generating random bits at a rate of up to 6.2 Gbits per second. Theoretically, with even faster electronics, the currently disclosed random number generator could generate random bits at a rate of multiple Terabits per second. However, if cost is a concern, the disclosed QRNG will also work with slower but cheaper back-end electronics (e.g., slower detectors, digitizers, etc.). Using slower but cheaper back-end electronics can facilitate decreasing the cost of the disclosed QRNG.

In other embodiments, A-D converters 710*a* and 710*b* can be multi-bit digitizers. For example, A-D converters 710*a* and 710*b* can output not a single bit at a time, but "words" of 8 bits correlated with the intensity of the detected RF signal. The 8-bit words can also be sent to be combined by combiner 712. In such embodiments, the bitstream coming out of combiner 712 can exhibit unwanted correlations and biases, and therefore exhibit less than perfect entropy. In the exemplary embodiment discussed here, the output bitstream could exhibit only 4 bits of entropy for every 8 bits. It would therefore be necessary to apply an entropy extraction function (which are discussed in further detail below) at the back-end 714 to extract a shorter bitstream with substantially full quantum entropy. With sufficiently fast electronics, embodiments that use multi-bit digitizers and entropy extraction functions can generate random bits at least as fast as the single-bit embodiments.

Figure 8:
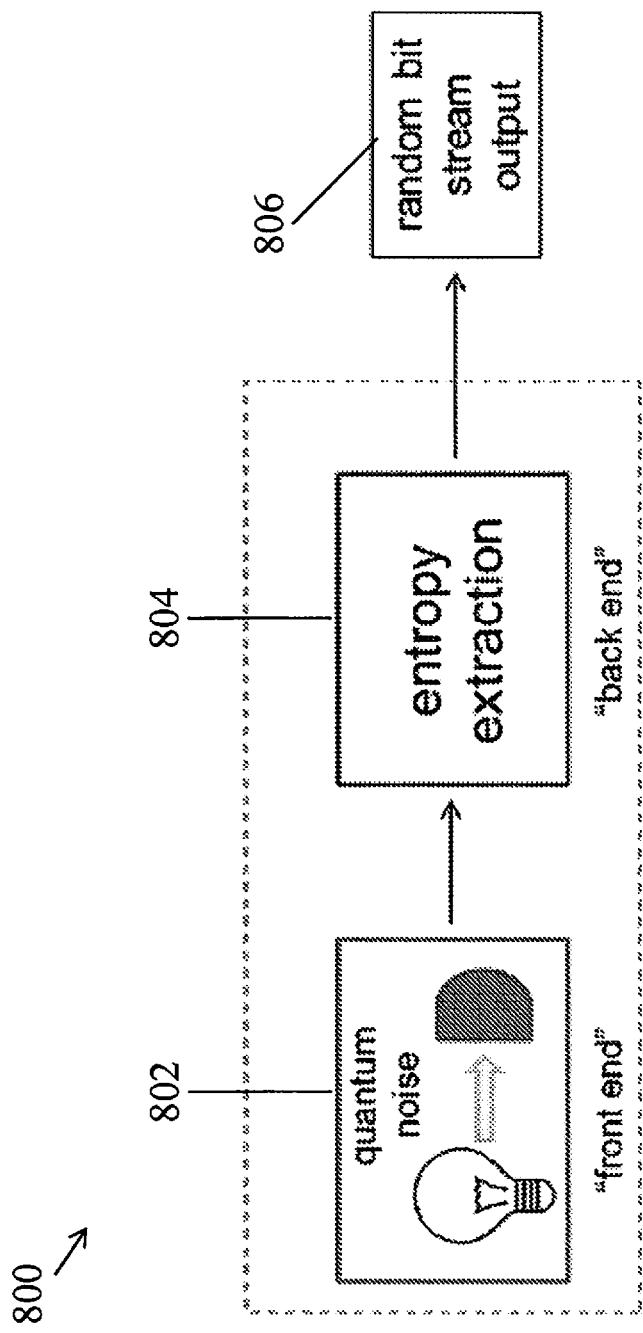
FIG. 8 is a block diagram of a random number generator high-level architecture containing a front-end and a back-end and outputting a random bit stream, according to some embodiments.

In other representative embodiments illustrated in FIG. 8, the disclosed RNG can be configured according to a high-level architecture for cryptographic true random number generators (TRNG), 800, with a physical entropy source "front end", 802, and an entropy extraction "back end", 804, producing an independent identically distributed (i.i.d.) stream of output bits with "full entropy" (one bit of entropy per physical bit), 806. The "front end" 802 can be implemented at least in part using any of the previously disclosed embodiments, as well as the embodiments described below. In some embodiments, front-end 802 and back end 804 can both be implemented on a single, monolithic chip. In other embodiments, front-end 802 and back-end 804 can be implemented on separate chips. In some embodiments, front-end 802 and back-end 804 can be implemented as multiple separate hardware and/or software modules. In yet other embodiments, front-end 802 can be coupled to back-end 804 indirectly, for example, through a network, and the two components can be geographically separate.

Implementing front-end 802 (including the light source) and back-end 804 in a single, monolithic chip can be advantageous for decreasing the cost of the disclosed QRNG. Implementing everything on a single chip can decrease the time, effort and cost required to align disparate components, such as the light source with a single mode filter, etc. In some embodiments, the light source can be integrated into the silicon on the chip using, for example, Germanium deposited on the silicon.

Figure 9:
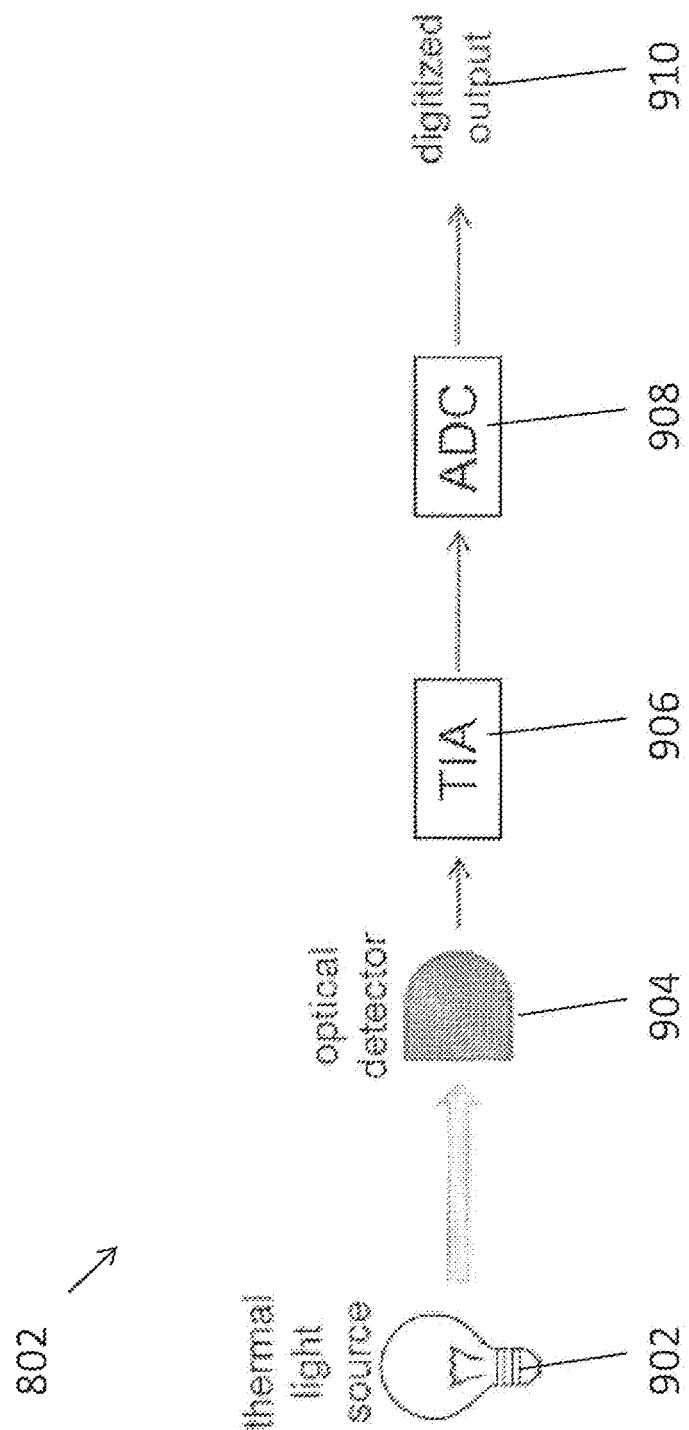
FIG. 9 is a block diagram of a random number generator front-end in which a thermal light source is used to produce a digitized output, according to some embodiments.

FIG. 9 depicts representative RNG "front end", 802, in more detail. The RNG front end 802 can have four elements: (1) a thermal light source 902, the random fluctuations of whose optical output power provides the entropy source of quantum origin; (2) a multi-GHz bandwidth optical detector 904 to register the output of the thermal source; (3) a trans-impedance amplifier (TIA) 906 to convert the detector output into a voltage; and (4) an analogue-to-digital converter (ADC) 908 to digitize the noisy electrical signal derived from the source at a rate of multiple Giga Samples per second (a Giga Sample, also called a GSample or GS, is a billion samples). Relatively simple state of health and/or basic randomness tests can also be conducted at this stage, such as checking that as many 1s are being generated as 0s.

In some embodiments, the thermal light source 902 can be a single or dual-polarization semiconductor optical amplifier (SOA) discussed above. In the following embodiments, for ease of explication, a single-polarization SOA having the following parameters is assumed: (1) ASE central wavelength, $\lambda=1558$ nm; (2) optical 3 dB bandwidth, 82.3 nm, or 10 THz, in frequency units; (3) optical gain, G=27.7 dB; and (3) noise figure, 8.1 dB, or noise factor, $\chi=6.5$. Other types of light sources can be used as well, with suitable replacement of parameters in what follows.

The SOA thermal light output is fiber-coupled to a high-bandwidth (20 GHz for this disclosure) telecom-standard optical detector 904 operating in the linear regime. In some embodiments, the SOA's output could be spectrally filtered through an optical filter of 3 dB bandwidth $B_{op}$ (not shown). In the embodiment depicted in FIG. 9, the full spectral output of the SOA, $B_{op}=10$ THz, is received by the optical detector 904. The detector's electric output is coupled to a transimpedance amplifier (TIA) 906, and then sampled at a high rate using an analogue-to-digital converter (ADC) 908. The inverse of the sampling bin time sets the electronic bandwidth, $B_{el}$; in this exemplary embodiment, the electronic bandwidth can be set at a few GHz. Although the SOA output is single transverse mode, for the present RNG $M=B_{op}/B_{el}$ longitudinal modes contribute to the digitally-sampled signal. For example, with $B_{el}=1$ GHz, we have $M \sim 10,000$ longitudinal modes.

The probability that a given longitudinal mode contains n photons is given by a Bose-Einstein (BE) probability distribution;

$$P_{BE}(n; \langle n_{sp} \rangle) = \frac{\langle n_{sp} \rangle^n}{(1 + \langle n_{sp} \rangle)^{n+1}}$$

with mean-photon number $N_{BE}=\langle n_{sp} \rangle$, variance, $\text{var}_{BE}=\langle n_{sp} \rangle(1+\langle n_{sp} \rangle)$, and $\langle n_{sp} \rangle = \chi(G-1)$. With the SOA parameters discussed above, the $N_{BE}$ corresponds to approximately 4,000 photons per longitudinal mode. This occupation number per mode is very much larger than would be feasible with an incandescent source, and is the basis for the large amount of quantum entropy per bit produced by the present RNG's front end.

Making the approximation that the SOA gain, G, and noise factor, $\chi$, are independent of wavelength, the probability that the PD/TIA/ADC system detects n photons in one sampling bin is given by an M-fold degenerate BE, or negative binomial (NB) distribution, $$P_{NB}(n; \bar{n}, M) = \frac{\Gamma(n+M)}{\Gamma(n+1)\Gamma(M)}\left(1 + \frac{M}{\bar{n}}\right)^{-n}\left(1 + \frac{\bar{n}}{M}\right)^{-M}$$

where $n\bar{n}$ is the mean number of photons detected per sampling bin. The NB photo-count variance is given by $$\text{var}_{NB} = \bar{n} + \left(\frac{\bar{n}^2}{M}\right)$$

On the right hand side of this expression it is noted that the first term corresponds to the statistical (shot noise) fluctuations that would be present even if photons were distinguishable classical particles, while the second term corresponds to quantum fluctuations arising from the quantum phenomena of spontaneous emission and quantum-enhanced amplitude ("bunching") for photons, as identical bosons, to be emitted into modes already containing photons. With the approximation of wavelength-independent SOA gain and noise factor, we have $\bar{n} \sim M\chi G$. Therefore, the RMS photon-number quantum fluctuation $\sigma_{Q,N}=\bar{n}/\sqrt{M}$ is larger than the photon-number shot noise RMS fluctuation $$\sigma_{shot,N} = \sqrt{\bar{n}}$$

by a factor of $\sqrt{\chi G}$ (which, for the values of $\chi$ and G given above, is approximately 62), independent of the number of longitudinal modes, M, and hence the digitization time bin width. This means that, in contrast to other RNGs, a large component of the entropy of the present RNG's digitized output will have a fundamentally quantum origin, which can be quantified as follows.

The digitized output voltage, V, of the detector and TIA will have a fluctuation probability distribution with RMS value, $\sigma_V$, which can be expressed as the root-sum-square (RSS) of: an electronic noise RMS fluctuation, $\sigma_{el}$; a photon-number shot-noise RMS fluctuation, $\sigma_{shot,V}$; and a quantum RMS fluctuation, $\sigma_{Q,V}$:

$$\sigma_V = \sqrt{\sigma_{el}^2 + \sigma_{shot,V}^2 + \sigma_{Q,V}^2}$$

Noting that the mean number of photons detected per sampling bin, $\bar{n}$, is proportional to the mean optical power, P, from the SOA, the contributions of electronic noise, photon number shot noise, and photon number quantum noise to the entropy of the digitized bit stream can be determined by measuring $\sigma_V$ as a function of P, and fitting the result to the phenomenological model:

$$\sigma_V = \sqrt{a + bP + cP^2}$$

Here a, b, and c are constants for a particular digitization time bin width, and we have $$\sigma_{el} = \sqrt{a}$$

$$\sigma_{shot,V} = \sqrt{bP}$$

$$\sigma_{Q,V} = \sqrt{cP^2}$$

A quantum signal to noise parameter is defined as:

$$QSN = \frac{\sigma_{Q,V}}{\sqrt{\sigma_{el}^2 + \sigma_{shot,V}^2}}$$

The present RNG has a QSN=7.3 at the typical operating point (mean optical power, P) of the SOA, which is very much larger than any competing RNG, most of which rely on intrinsically very small single-photon or shot noise signals. The present RNG therefore has a robust quantum component of entropy within its optical source, which is an enabling feature for both its very high bit rate, and the security assurances of the unpredictability of its output.

In practice, the gain and noise factor of the SOA are not constant across the optical bandwidth. However, the above expressions can be used for a phenomenological fit to the fluctuation as a function of SOA output optical power, allowing the quantum noise component to be isolated.

In one embodiment, referred to herein as the "RNG-basic" embodiment, the disclosed RNG can provide an output bitstream at rates of up to 6 Gbps. This output bitstream has an entropy per bit that is predominantly of quantum origin, and can pass the statistical randomness test suite SmallCrush in the TestU01 software library (SmallCrush is described in P. L'Ecuyer, R. Simard, "TestU01: A C library for empirical testing of random number generators," ACM Transactions on Mathematical Software (TOMS), v.33 n.4, p.22-es, August 2007, incorporated herein by reference in its entirety), which is more comprehensive than the NIST test suite ("A Statistical Test Suite for Random and Pseudorandom Number Generators for Cryptographic Applications," NIST SP800-22 National Institute of Standards and Technology (2001)). In the RNG basic embodiment, the ADC 908 at the front-end 802 is a comparator, producing a bit stream that has undesirable bias and correlations. This bit stream is input into a back-end 804 that implements streaming conditioning algorithms, to remove these features when producing the output bit stream, 806.

Figure 10:
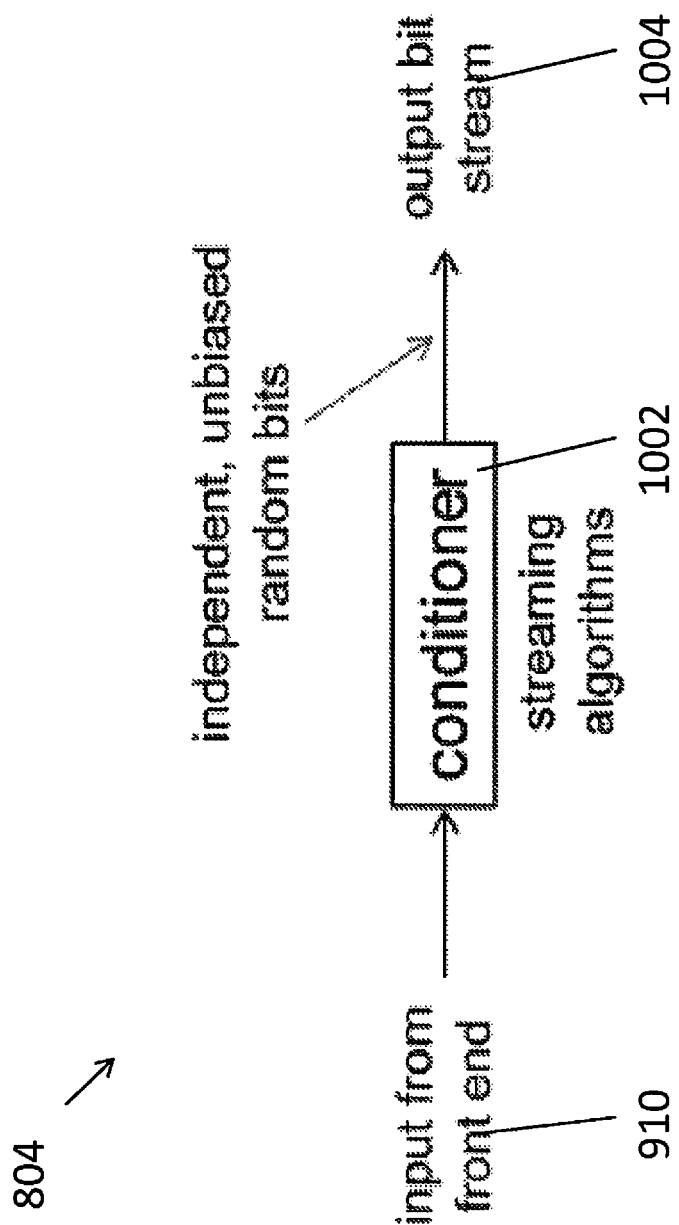
FIG. 10 is a block diagram of a basic random number generator back-end which receives input from a front-end and produces an output bit stream, according to some embodiments.

FIG. 10 depicts in more detail a representative RNG "back end", 804, in accordance with the "RNG-basic" embodiment. According to the RNG-basic embodiment, the RNG back end 804 can include a conditioner 1002 configured to apply streaming algorithms for producing independent, unbiased random bits from the input 910 provided by the front end ADC, 802. The RNG back end 804 can also include hardware and/or software for implementing a model (not shown) for estimating the amount of entropy in the bit string arising from quantum noise in the thermal light source. The model can estimate the amount of quantum entropy by varying the power fed to the light source, as discussed in more detail in relation to FIG. 14 below. The RNG back end 804 can also conduct basic randomness testing of the output bit stream. One such randomness test is the FIPS140-2 randomness test, as described in the Federal Information Processing Standard (FIPS) Publication 140-2 (FIPS PUB 140-2), issued by the National Institute of Standards and Technology in 2001 and updated in 2002 (incorporated herein by reference in its entirety).

For the case of independent random bits with a fixed, but not necessarily known bias, von Neumann's algorithm (details of which can be found in J. von Neumann, "Various techniques used in connection with random digits", Appl. Math. Ser., Notes by G. E. Forstyle, Nat. Bur. Stad., vol. 12, pp. 36-38, 1951—the entire contents of which are incorporated by reference herein) can be applied streamwise to produce a shorter, unbiased stream of independent random bits. It is a very nice feature of this algorithm that it removes the requirement to fine tune the operating point of the entropy source to achieve an unbiased output. However, the output of the comparator on the RNG-Basic front end can have the feature that the bias of the next bit depends on the current bit: there are short-range correlations. This is called a "slightly-random" source, and it is known that there is no Boolean algorithm, which applied to the bit stream can produce independent, unbiased random bits. Further, use of von Neumann's algorithm in these circumstances can introduce more problems than it solves.

However, reasoning that, because of the absence of long-range correlations, the output bit stream and a suitably delayed version of itself constitute independent slightly random sources, known algorithms can be applied to produce independent, unbiased bits. Such known algorithms can include those disclosed by, for example, U. V. Vazirani, "Towards a Strong Communication Complexity Theory or Generating Quasi-random sequences from two communicating semi-random sources," 15th Annual ACM Symp. on Theory of Computing, pp. 366-378, 1983 (incorporated by reference herein in its entirety). Specifically, conditioner 1002 can apply (stream-wise) the bit-wise XOR of the output bit stream with the delayed version of itself: each "new" bit, $x_i$, is XOR-ed with the bit that is m bit positions "older", $x_{i-m}$, to give the conditioned output stream $y_t = x_i \oplus x_{i-m}$. Here, the offset m is selected to give an output that passes comprehensive statistical test suites, and once chosen can be fixed. This scheme has the feature that it can be easily implemented with simple high-speed electronic logic circuits. One skilled in the art would recognize that sequences of several bits could be XOR-ed with the corresponding bits in the offset sequence resulting in some compression of the bit stream, but for this disclosure we only XOR single bits.

Figure 11:
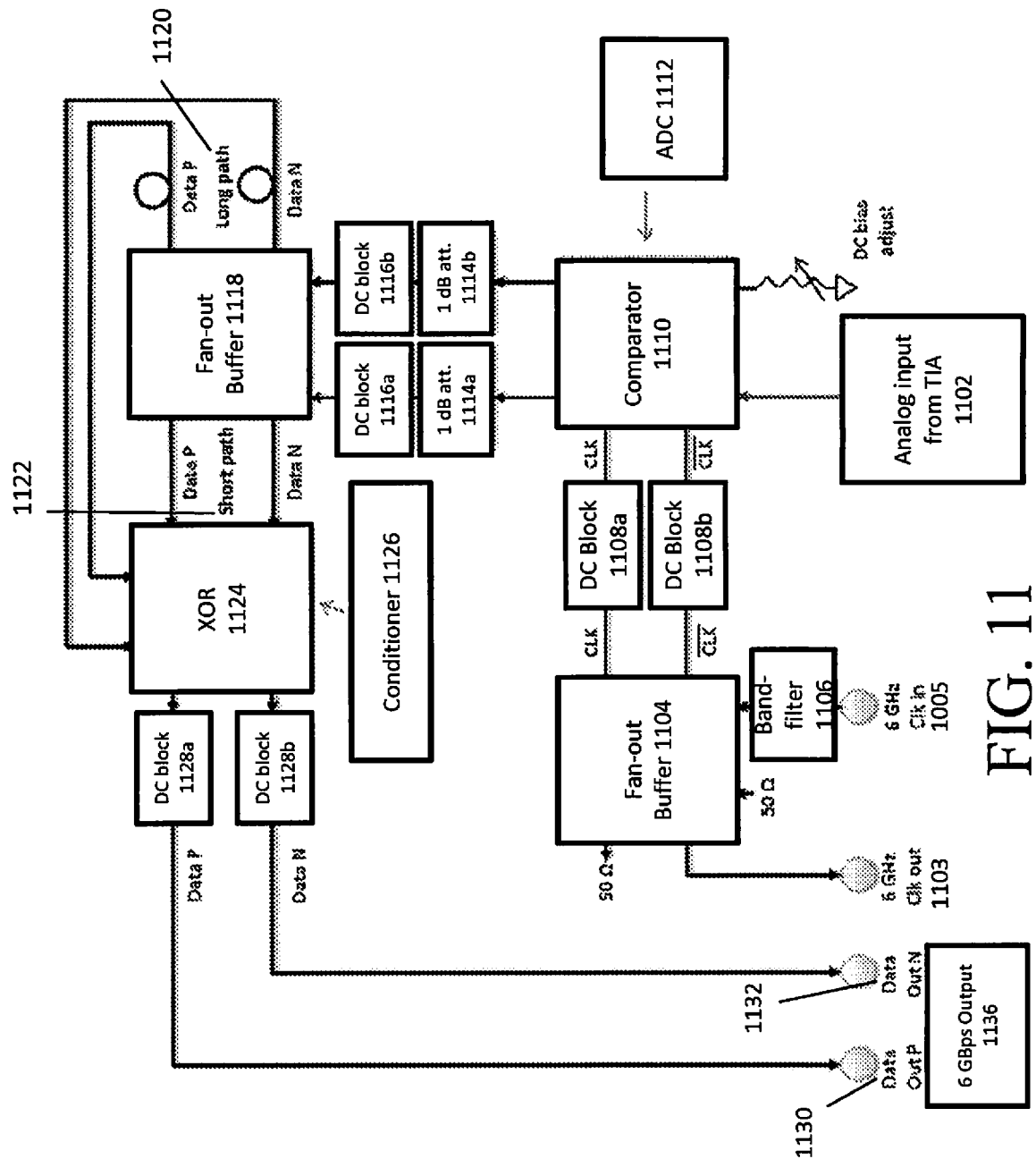
FIG. 11 is a block diagram showing a post-processing circuit that produces streaming output, according to some embodiments.
Figure 12:
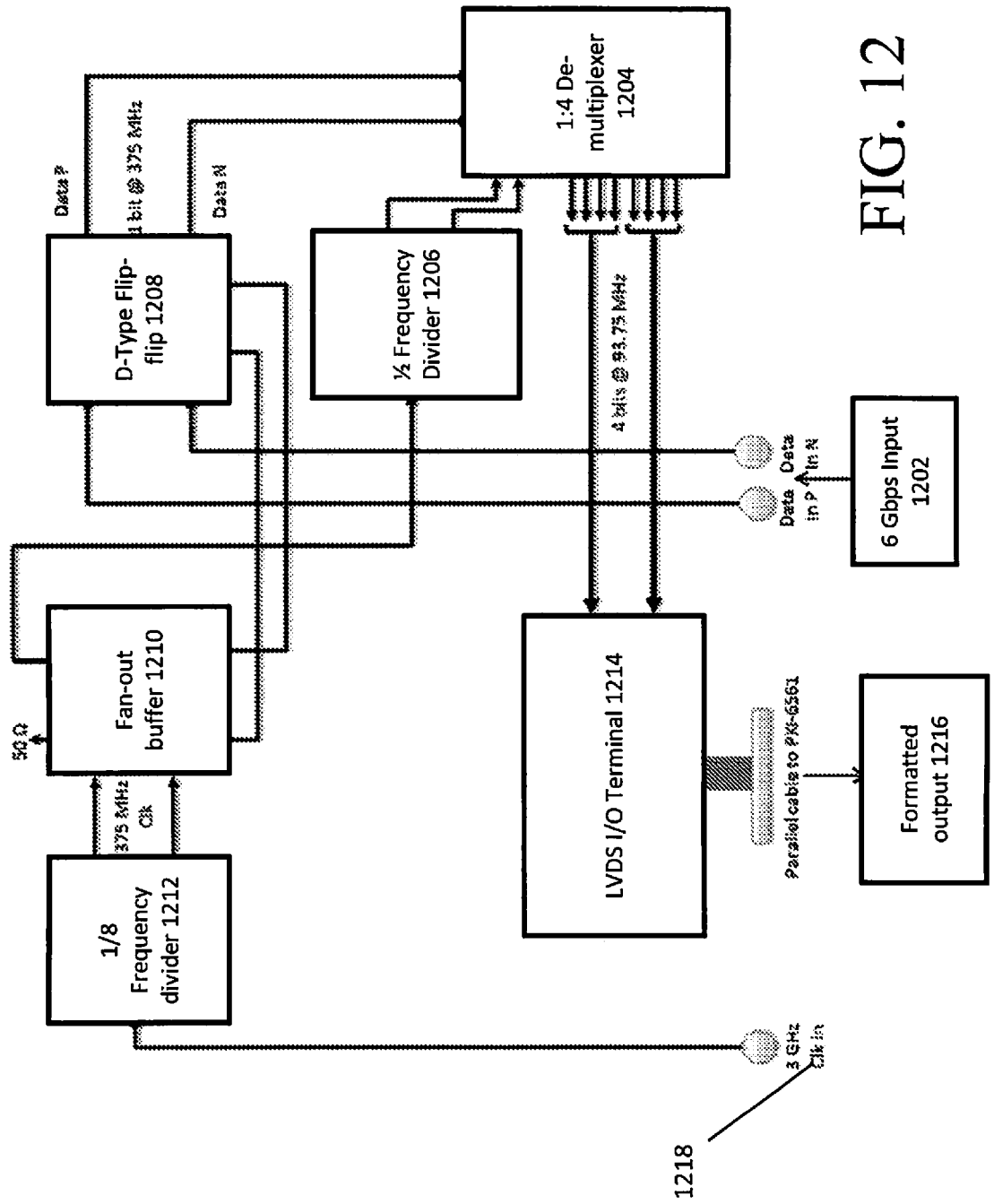
FIG. 12 is a block diagram showing a post-processing circuit that produces formatted output, according to some embodiments

For applications that can accept a streaming random bit string at 6 Gbps the back-end can be implemented in hardware as shown in FIG. 11. Also, recognizing that other applications may require a PC interface to the bit stream, an additional hardware stage can be implemented that accepts the streaming output shown in FIG. 11 and formats it as shown in FIG. 12, to give an output that is directly readable by a PC.

FIG. 11 is a block diagram illustrating an exemplary back-end, according to some embodiments. The randomly fluctuating analog signal from the optical detector in the front-end can be amplified by a trans-impedance amplifier 1102 and provided to one input of comparator 1110. The other comparator input can be set by a user to a constant DC level, such that half of the time the analog input is less than this constant DC level, and half of the time it is greater.

The analog signal from the optical detector can be inherently asynchronous. In order to create a steady stream of output bits the comparator requires a periodic clock signal. This signal can originate from an external 6 GHz oscillator 1105, whose output is passed through a 6 GHz bandpass filter 1106, and which then drives fan-out buffer 1104. The fan-out buffer 1104 creates a complimentary pair of clock pulses which pass through a pair of DC blocks 1108a and 1108b to remove any DC electrical level before driving the comparator 1110.

The comparator 1110 can receive the complementary clock pulses and evaluate the amplitude of the analog signal on each clock cycle. If the analog signal is greater than the reference voltage it outputs one complementary logic state (e.g., [1, 0]), and if the analog signal is less than the reference voltage it outputs the opposite complimentary logic state (e.g., [0, 1]). In another embodiment of this circuit, the comparator 1110 can be replaced with an analog-to-digital converter 1112 which outputs a larger number of bits whose value depends on the magnitude of the difference between the analog signal and the reference voltage.

The complimentary signals output by the comparator 1110 can be passed through a pair of 1 dB attenuators 1114a and 1114b and DC blocks 1116a and 1116b which set the voltage levels to the correct values for the inputs of the fan-out buffer 1118. This fan-out buffer 1118 can output two copies of the complimentary signals at its input. One copy is directed to a long path 1120 and other is directed to a short path 1122. These two paths can be rejoined as the two inputs to a logical XOR 1124 which outputs a single complimentary bit stream which is the XOR of the two inputs. This complimentary data stream is once again passed through a pair of DC blocks 1128a and 1128b and made available to the user at the output ports 1130 and 1132. The user is also provided with a copy of the 6 GHz clock at 1103 for purposes of synchronization. Other embodiments of this circuit can replace the XOR 1124 with other conditioning processes 1126.

FIG. 12 depicts a circuit that can process a stream of bits, such as that output from the circuit depicted in FIG. 11, into a form suitable for interpretation by a computer, according to some embodiments. This circuit receives a complementary string of randomly-chosen bits at 6 GHz at two input ports 1202. The circuit can also receive an input clock signal 1218 which is synchronized to the input bit stream but at 3 GHz instead of 6 GHz. This clock signal can be passed to a one-to-eight frequency divider 1212 which generates a complimentary clock signal at 375 MHz. This signal can be input to fan-out buffer 1210 which can generate two identical copies of the 375 MHz signal. One copy can be used to trigger a D-type flip-flop 1208 which stores one bit from the random source 1202 at each clock pulse. The complementary output of the flip-flop is a single bit sampled at 375 MHz, which can be passed to a one-to-four demultiplexer 1204. The other output from the fan-out buffer 1210 can be passed to a one-to-two frequency divider 1206 to create a clock signal at 187.5 MHz. The one-to-four demultiplexer 1204 can sample the input data at the 375 MHz data rate and create a parallel output signal that is four bits wide at one-fourth the clock rate. This four-bit-wide signal can be sent to a Low Voltage Differential Signaling (LVDS) input-output terminal 1214 which collects all the four-bit-wide signals into a format which can be easily interpreted by a computer 1216.

In another embodiment, referred to herein as the "RNG-FQE (full quantum entropy)" embodiment, the disclosed RNG can provide an output bitstream that has one bit of min-entropy (defined below) of quantum origin per bit. This embodiment has been demonstrated at offline rates of up to 44 Gbps. In the RNG-FQE embodiment, the ADC 908 at the front end 802 is a multi-bit digitizer that outputs eight-bit words to the back-end 804 (this is in contrast to the RNG-basic embodiment, where the ADC 908 at the front end 802 is a simple comparator that simply outputs a bit stream one bit at a time). Longer or shorter words are also possible.

Figure 13:
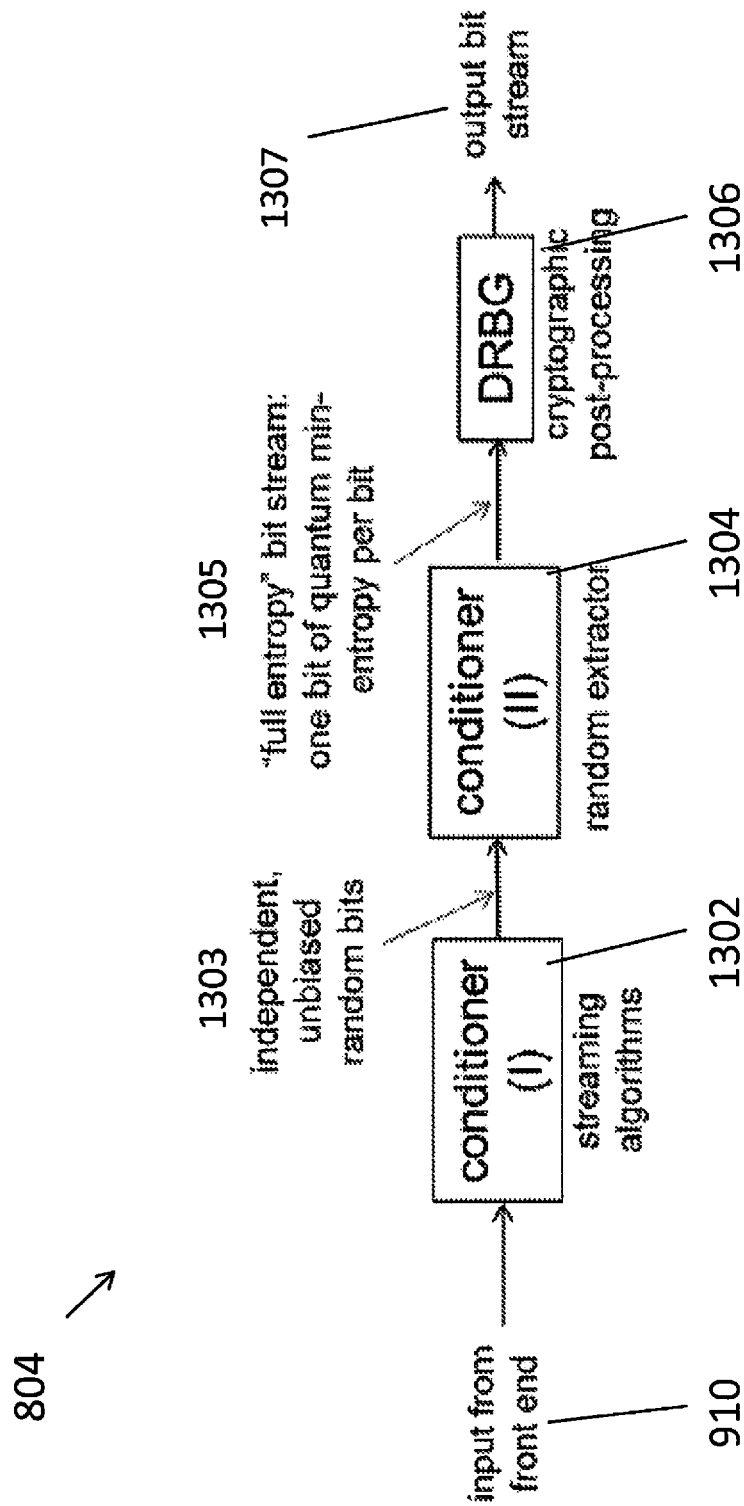
FIG. 13 is a block diagram of a full quantum entropy random number generator post-processing stage, according to some embodiments.

FIG. 13 is a representative back-end 804 according to the RNG-FQE embodiment. The eight-bit words from ADC 908 are passed through a first conditioning stage 1302, that outputs stream 1303 of independent, unbiased random bits with the full entropy of light source 902 and detection system (904, 906). This first conditioning stage 1302 also provides robustness for the randomness of this bit stream: it automatically compensates for slow variations in the SOA or detection electronics operating points. This compensation applied by the first conditioning stage can be implemented using the algorithm disclosed in M. Blum, "Independent Unbiased Coin Flips from a Correlated Biased Source—A Finite State Markov Chain", Combinatorica 6 (2), 97-109 (received Feb. 14, 1985; revised Dec. 28, 1985) (incorporated by reference herein in its entirety). In contrast, it can be necessary to carefully select bias set points in the RNG-basic embodiment. A second conditioning stage 1304 can apply a random extractor function to the bit stream, which produces a shorter output bit stream with full quantum entropy, 1305. Finally, if desired, this bit stream 1305 can be input to a NIST (National Institute of Standards and Technology)-recommended cryptographic deterministic random bit generator (DRBG) 1306, whose output bit stream 1307 can be used for cryptographic purposes. The NIST standard can be found in "Recommendation for Random Number Generation Using Deterministic Random Bit Generators," National Institute of Standards and Technology Special Publication 800-90 A (2013) (the entire contents of which are incorporated by reference herein). The final DRBG stage provides further security robustness and defense-in-depth: the output will continue to be statistically indistinguishable from random even if there should be a failure within the quantum noise source.

As previously discussed, the RNG-FQE embodiment can use an 8-bit digitizer as the ADC output of the front end, instead of the (one-bit) comparator of RNG-basic. This 8-bit digitizer can operate at a 3 GSample per second digitization rate. Other digitizer word sizes and rates are possible. Each sample can produce an 8-bit word representing the output voltage of the photo-detector and hence the optical power from the light source. In a steady state the distribution of sampled powers is characterized by a RMS fluctuation that is a convolution of electronic noise; optical shot noise; and Bose-Einstein (quantum) noise. These noise components can be separated by measuring the fluctuation as a function of the mean optical power, as shown in FIG. 14.

Figure 14:
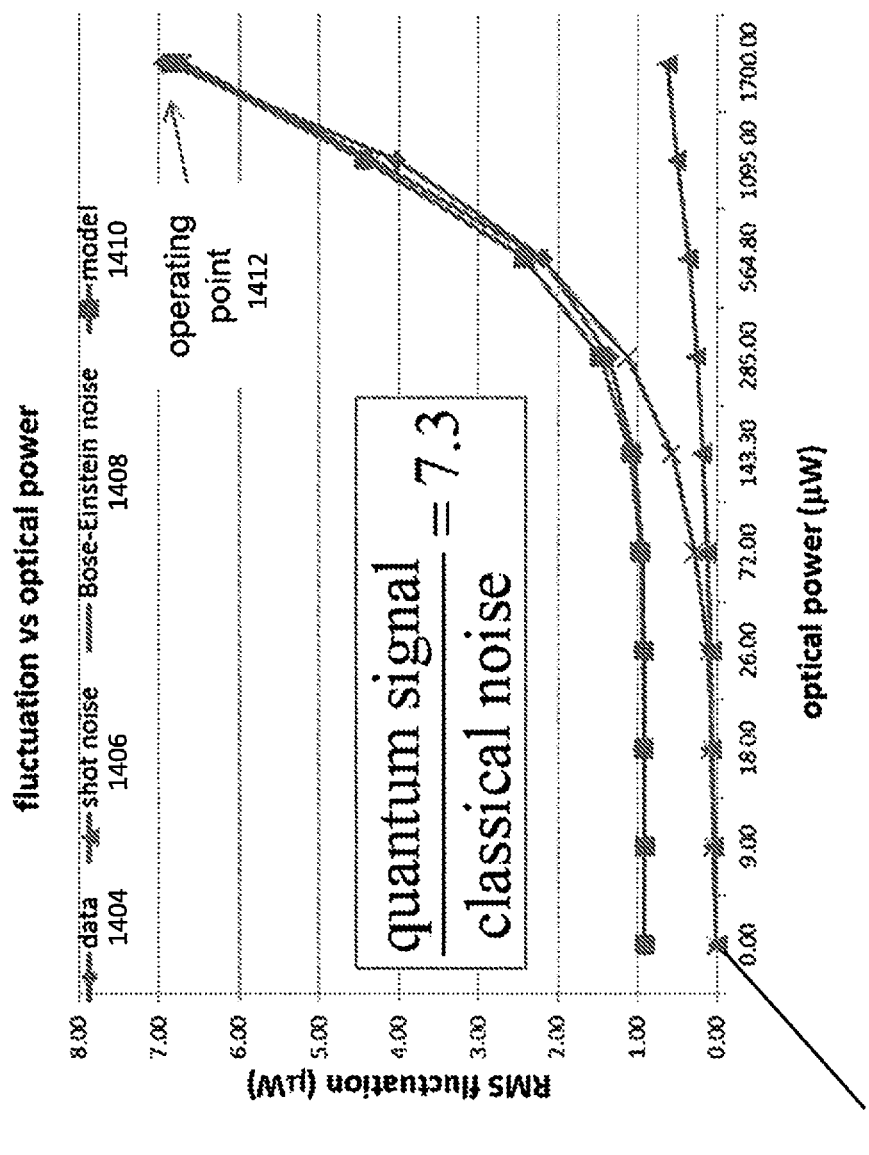
FIG. 14 shows representative entropy characterization data of a full quantum entropy random number generator, according to some embodiments.

FIG. 14 shows root-mean-square (RMS) optical intensity fluctuations in μW on the vertical Y-axis, and mean optical power output from the front-end light source in μW on the horizontal X-axis. The data line 1404 shows experimentally-observed RMS fluctuations as a function of optical power using one embodiment of the disclosed QRNG. The model line 1410 shows predicted RMS fluctuations as a function of optical power using the previously discussed equation for NB photo-count:

$$\mathrm{var}_{NB} = \bar{n} + \left(\frac{\bar{n}^2}{M}\right)$$

As can be seen, there is close correspondence between model line 1410 and data line 1404, indicating that the model has good predictive power. For the purposes of this figure, the following parameters were employed: mean photon number per sample was equal to $4.3 \times 10^6$, typical operating power was set at 1700 μW, and the number of modes M was set at 8,000 (in this case 8,000 longitudinal modes×1 transverse mode for a total of 8,000 modes). The shot noise line 1406 corresponds to the first term on the right hand side of this expression—as previously discussed, this first term corresponds to the statistical (shot noise) fluctuations that would be present even if photons were distinguishable classical particles. The Bose-Einstein noise line 1408 corresponds to the second term on the right hand side of this expression—as previously discussed, this second term corresponds to quantum fluctuations arising from the quantum phenomena of spontaneous emission and quantum-enhanced amplitude ("bunching") for photons, as identical bosons, to be emitted into modes already containing photons.

At zero optical power, 1402, the RMS fluctuation is dominated by an electronic noise component (electronic noise, as distinct from optical shot noise, is constant regardless of optical power. It is not shown on this graph, but if it were, it would be a horizontal line). At the normal operating point 1412 (at approximately 1700 μW optical power) the fluctuations are dominated by the quantum component. Defining (as before) a quantum signal-to-noise (QSN) parameter as the ratio of the Bose-Einstein fluctuation to the convolution of the electronic and shot noise components of the fluctuation, resulting in a large QSN value of 7.3 at the normal operating point, i.e. the output entropy is strongly dominated by noise of quantum origin, 1412. To quantify this the Shannon entropy of the measured digitizer output probability distribution is evaluated:

$$H = -\sum_{x \in X} P(x) \log_2 P(x)$$

where the summation runs over the set X of all 8-bit digitizer outputs, and P(x) is the measured probability that word x occurs. At the normal operating power and a digitization rate of 3 GSamples per second, this results in H=4.89 bits. However, for cryptographic purposes we are more interested in the min-entropy:

$$H_\infty = -\log_2 P_{max}$$

This captures the probability that an adversary guesses the output using the optimal strategy of picking the most probable output, which has measured probability $P_{max}$. Thus, $H_\infty$=4.07 bits. From the earlier analysis of the QSN 99.6% of this min-entropy is traceable to Bose-Einstein (quantum) noise. Therefore, the digitizer output contains 4.05 bits of quantum min-entropy per 8-bit sample under these operating conditions. This sets the parameters for the random extractor stage of the back end, which are determined by monitoring the steady-state mean optical output power and its variance. In another example, digitizing at 12 GSamples per second with 4 bits per sample, this entropy estimation yielded 3.78 bits of quantum min-entropy per sample, and hence the 44-Gbps FQE random bit rate mentioned elsewhere in this document.

The digitizer output words cannot be used directly as a source of random bits to the entropy extractor, owing to correlations and biases. The first conditioning stage 1302 takes the digitizer output, which can be modeled as a Markov process, and produces a streaming output 1303 of independent unbiased bits, with the full Shannon entropy of the source, without requiring prior knowledge of the source's transition probabilities. Thus the present disclosure allows implementation of streaming algorithms for this extraction that can be performed in an FPGA. Examples of streaming algorithms that can be implemented for this extraction can be found in H. Zhao and J. Bruck, "Streaming algorithms for optimal generation of random bits," arXiv:1209.0730 [cs.IT] (September 2012) (incorporated herein by reference it its entirety). These algorithms represent the generalization to Markov processes of von Neumann's streaming algorithm for de-biasing a stream of i.i.d. bits. The first stage in this process is to map the digitizer's (correlated) output sequence into $2^8$ sequences of independent 8-bit symbols. Each of these new sequences can be thought of as the result of repeatedly rolling a biased $2^8$-sided die, and through a binarization tree algorithm, can be transformed into multiple sequences of random bits. Then, using a binary-tree generalization of von Neumann's algorithm, each of these sequences can be transformed into a sequence of unbiased independent random bits. Finally, all of these are recombined (by concatenation) to produce one overall output sequence of independent unbiased bits, which has one bit of the source's Shannon entropy per output bit. This is an important failsafe security feature of the design: the first conditioning stage cannot produce more output bits than the Shannon entropy of the digitized source. Basic online statistical randomness testing (monobit test, Poker test, runs test, etc.) can be performed to verify correct functioning of the system at this point.

FPGA implementation of these algorithms enables faster processing rates. To do this for the final, von Neumann stage (as described in the work of Zhao and Bruck, referenced above) the entire binary decision tree can be built in the FPGA. Each node in the tree represents a different state of the decision tree as to the determination of whether it should be a '1' or '0'. Rather than execute each node sequentially as done in software, the hardware design executes all the nodes in parallel. However, there will only ever be a single node active per level of the tree, so the maximum parallelism is $\log_2$(number of nodes), and only when the maximum number of states are required in the tree itself. The depth of the tree required depends on the non-random appearance of the data and cannot be determined in advance. This approach uses more resources than would be necessary with a serialized approach, but allows the engine to accept a new bit of data every clock cycle. Serializing the execution would reduce the rate at which data could be accepted and lead to a lower final bit rate. Analogous trees are used for the earlier, Markov and n-sided die, stages.

Next, second conditioning stage 1304 extracts the quantum min-entropy from the output binary sequence of the first conditioning stage 1302. The "left-over hash lemma" (discussed in, for example, D. R. Stinson, "Universal hash families and the left-over hash lemma, and applications to cryptography and computing", 3. Combin. Math. Combin. Comput. 42, 3 (2002), which is incorporated herein in its entirety) shows that this extraction can be performed using universal hash functions to compress a longer binary sequence into a shorter one that has one bit of (quantum) min-entropy per bit (full quantum entropy). Examples of such universal hash functions are disclosed in, for example, J. L. Carter and M. N. Wegman, "Universal classes of hash functions", J. Comp. Sys. Sci. 18, 143 (1979) (incorporated herein by reference in its entirety). The compression parameters (e.g., choice of hash family) are determined by the measured parameters (e.g., mean optical power and its variance) of the digitized output of the front end. The second conditioning stage 1304 can implement a suitable streamwise hash function efficiently in an FPGA or ASIC; for example a cryptographic-CRC hash implementation is particularly suitable (discussed in, for example, H. Krawczyk, "LFSR-based hashing and authentication", Lect. Notes Comp. Sci. 839, 129 (1994), which is incorporated herein in its entirety). Randomness extraction can also be performed using cryptographic algorithms such as the SHA family or AES (discussed in, for example, Y. Dodis et al., "Randomness extraction and key derivation using the CBC, Cascade and HMAC modes," Lect. Notes. Comp. Sci. 3152, 494 (2004), which is incorporated herein in its entirety). This can be convenient if these algorithms are already available in firmware, such as for the NIST-recommended cryptographic post-processing stage.

For example, at the second conditioner 1304, an estimate of the entropy of a distribution can be made to determine the amount of quantum min-entropy per bit produced. If the entropy is less than 1 bit per bit produced, then the random number string can be compressed using a hash function so that 1 bit of quantum entropy is present in each final hashed bit. For example, the probability of a transition of a 1 to a 0 or a 0 to a 1 is preferably 0.5. If it were instead $p_{max}$=0.58 then the min entropy $H_{2s}$=$-\log_2(p_{max})$=$-\log_2(0.58)$=0.786 bits of min-entropy per bit produced. A compression ratio of final bits to input bits of 0.786 would then provide a random number string with 1 bit of entropy per bit. The compression can be achieved by, for example, entering 256/0.786 bits into the SHA256 function. The resulting 256 bits would have 1 bit of entropy per bit. A well designed instantiation of this random number generator can produce 1 bit of entropy per bit.

The full quantum entropy output of the second conditioning stage 1304 is then input to a NIST-approved cryptographic deterministic random bit generator (DRBG) 1306, the output of which can be used as cryptographic random bits. A suitable DRBG can be readily implemented in an FPGA or ASIC.

A representative method 1500 of generating a random bitstream is illustrated in FIG. 15. At 1502, a light source is selected, generally a light source that produces an output flux having a low correlation for suitable short delays. At 1504, the optical flux from the light source is used to produce an optical intensity signal, typically using a square law detector such as a photodiode. A signal delay is selected at 1506, and delayed and undelayed signals based on the optical intensity signal are combined. At 1510, a random bitstream is provided as an output. The combined signals can be based on the optical signal and an optically delayed optical signal (such as produced using optical fiber as a delay line) or a photodetector signal and an electrically delayed copy of the photosignal. Various kinds of post processing can be done to the random bitstream to reduce imperfections (e.g., bias and/or correlations) and to extract its entropy.

EXAMPLE USE CASES

The RNGs described herein can be used in a variety of ways and for a variety of applications. For example:

Use Case 1: Cryptographic Random Bit Generator an Embedded Component for Hardware Security Modules (HSM) and End Devices Random numbers are the foundation on which all of cryptography is built. The difficulty of acquiring sufficient entropy, especially in end-user devices, is a common security weakness, and has been identified as a challenging problem in new application areas such critical-infrastructure cyber security. The QRNGs described herein are able to meet these needs. They are able to produce an output stream with an extremely high entropy at a high speed, and some embodiments may also may be constructed cheaply, use very little power, and have a compact footprint. It could also be incorporated into HSMs as a security upgrade to replace the currently used deterministic random bit generators.

Use Case 2: Data Center Security: SSL/TLS with Forward Secrecy

Recent revelations about surveillance of email and other network traffic has led some providers (e.g., Google, and CloudFlare) to implement SSL/TLS using the "perfect forward secrecy" option, i.e., ephemeral Diffie-Hellman (DHE) session key establishment. This implementation requires significantly more entropy than the older, RSA-based session key establishment method, which is less secure. This trend towards perfect forward secrecy implementation is likely to increase with the growing awareness of privacy concerns. Further, the added defense-in-depth from using DHE would have mitigated the security impact of the Heartbleed vulnerability in OpenSSL, as has been pointed out by the Electronic Frontier Foundation. CloudFlare have pointed to the greatly increased need for randomness as an issue for the wide implementation of DHE, especially in the cloud environment. This can be understood by first examining the steps in the RSA-based method for session key establishment. The server's RSA public key has two functions: to allow the client to authenticate the server, and for the client to encrypt the "pre-master" secret and transmit it to the server. (The pre-master secret ultimately becomes the session key.) Because the server's public key can remain valid for a year or more, and changing it is expensive and cumbersome, its compromise would also compromise every session key that has been established under it. With perfect forward secrecy, the server's RSA public key is only used for the client to authenticate the server, but a fresh DHE procedure is used in each session to establish the pre-master secret and hence the session key. Both server and client require a source of random bits to implement DHE. This can be particularly stressing on the server, which may have to support the initiation of several thousand, to multiple tens of thousands, unique Us sessions per second in a cloud environment. With random numbers also required for each session's unique nonce values, session ID number, and initialization vector, the server can easily require random numbers at multiple Gbps rates: the presently disclosed RNG can easily sustain these rates. If the client is itself a data center or a distinct part of the server's data center, the client may also requires a source of randomness at these high rates. In the future, it may become desirable to change session keys at frequent intervals during a session for added security: compromise of a single key would only expose a small interval of a session's traffic, but not the entire session. A necessary condition for achieving this higher level of session security would be corresponding larger random bit rates: the presently disclosed RNG could support this concept. SSL/TLS is not the only widely-used protocol that can benefit from high rate randomness: SSH, IPsec and SIP all have the option of being implemented with perfect forward secrecy.

Use Case 3: Secure Cloud Data Storage

Cloud storage services such as Dropbox, iCloud etc. are a great convenience, but there are concerns about the security and privacy of personal or proprietary information in the cloud. A user device based on the presently disclosed RNG on a USB stick (or other convenient interface to a PC, tablet or smartphone) could mitigate these concerns by encrypting and authenticating data, using freshly generated keys, before uploading it to the cloud. The keys would be stored in the user device's secure memory, allowing the data to be recovered and verified after download, possibly to a different computing platform, by the user in the future.

Use Case 4: Threshold Secret Splitting for Robust, Secure Data Storage

For some sensitive applications, a concern with the scenario of use case 3 is its lack of robustness to accidental or malicious corruption of the stored data, or loss or theft of the user's key. If the stored, encrypted data is corrupted or the user loses his/her key, the user cannot recover the original data. Theft or copying of the user's key potentially exposes the encrypted data to adversaries. Examples of scenarios with these concerns include secure backup of data for disaster recovery, and storage of encryption master keys (key management). A device based on the presently disclosed RNG can mitigate these concerns through a simple threshold secret splitting scheme, which we illustrate here with the following two-out-of-three example. (Generalization to more shares is straightforward.) M is a binary string representing the data to be securely stored, encrypted under different encryption keys, in three distinct storage locations: A, B and C. The encryption key shares, $K_A$ (for location A), $K_B$ (for location B), and $K_C$ (for location C), satisfy the secret splitting property $$K_A \oplus K_B \oplus K_C = 0$$

Thus, using one-time pad encryption (for simplicity of presentation) storage location A receives $M \oplus K_A$, and similarly for locations B and C. The key shares are constructed by parsing the RNG output into three-equal length "pre-shares", P, Q and R, and forming $$K_A = P \oplus R$$

$$K_B = P \oplus Q$$

$$K_C = Q \oplus R$$

Each of the pm-shares (P, Q and R) is stored in a separate secure location (p, q and r). Thus, with access to any pair of the pre-shares (e.g. p and q), the original data, M, can be recovered from the corresponding encrypted, stored data (in this case, from storage location B). However, compromise of any one of the pm-shares cannot compromise the confidentiality of the stored encrypted data. Similarly, corruption of any one of the stored encrypted data sets is protected through redundancy of the other two storage locations.

Use Case 5: Quantum Key Distribution (QKD)

The transmitter node in the most widely used ("BB84") QKD protocol has a voracious demand for random numbers. For security it is essential that these random numbers have full entropy. (Use of a pseudo-random number generator ("PRNG") for example, would result in keys with no more security than the PRNG. And PRNGs can be diagnosed with remarkable ease.) With typical link efficiencies, to sustain a secret key rate of 1 Mbps, a QKD clock rate of 1 GHz is required. Then, each emitted quantum signal requires: one data bit; one basis bit; and between four and eight "decoy state" bits. The QKD transmitter can therefore require full-entropy random numbers at rates of 10 Gbps or more. This is very challenging with currently available commercial RNGs, but can be easily sustained by the presently disclosed RNG.

Use Case 6: One-Time Signatures

One-time signatures (OTS) are being considered as a practical alternative to RSA digital signatures for several reasons. First, OTS use fast cryptographic hash functions (e.g. SHA family) and so have much lower computational overhead than RSA signatures. For applications where low latency is essential, such as electric grid control, this can be a practical imperative. Second, the growing awareness of the vulnerability of present-day RSA and elliptic curve public key cryptography to a possible future quantum computer running Shor's algorithm is inspiring a search for new cryptosystems that are Shor-immune. OTS schemes are considered strong candidates for digital signatures within such a framework. However, in contrast to RSA signatures, where a single secret signing key can be used to sign many messages, OTS schemes require a fresh signing key for every message. Particularly in streaming data situations, OTS schemes can have a high demand for randomness to generate signing keys. Pre-distribution of a sufficient quantity of signing keys has obvious logistical and security concerns. In contrast, these difficulties can be avoided by using the presently disclosed RNG, which can easily meet the key rate required even for streaming data situations.

Use Case 7: Monte Carlo Simulation

Pseudo-random number generators are often used for Monte Carlo simulation. However, owing to the algorithmic structure of PRNG bit sequences, there have been notorious results that are artifacts of the PRNG structure. The presently disclosed RNG could supply the random numbers required at high rates for large-scale simulations using the Monte Carlo method. The true randomness would avoid these concerns of using pseudo-random number generators.

Use Case 8: Gaming

Random numbers are required for gaming and lotteries. For these applications, the presently disclosed RNG could supply "premium" randomness, with a "quantum guarantee" of fairness and tamper resistant.

Use Case 9: Enrollment for Certificate-Based PKI and the Internet of Things

In some cases, a QRNG can be used to facilitate and/or speed-up the enrollment process in a public key infrastructure (PKI) for use in enrolling people, or objects such as phones. In a public key infrastructure enrollment process, unique public/private key pairs have to be generated for each person or device, and there are several places where random numbers are required in the process. This process can be made faster, more secure, and/or more convenient using a QRNG embedded in a (potentially portable) enrollment device, such as a Public Key Infrastructure-Quantum Hardware Security Module (PKI-QHSM).

For generating RSA primes, randomized algorithms such as Miller-Rabin are typically used. These algorithms first generate a candidate large random integer (which can be done with a QRNG), then subject the candidate random integer to a primality test against another random test number (which could also be generated with a QRNG). This process is then repeated k times with a different random test number each lime. If any of the k tests fails, then the candidate is discarded and a new one generated. If all k tests pass, then the candidate number is prime, except with probability less than $2^{-k}$. This probability (of undetected compositeness) can be made arbitrarily small by making k large enough. The disclosed QRNGs can facilitate this process by generating large random numbers at a fast rate, while also providing assurance that the generated numbers are truly random.

Although preferred embodiments of the present invention have been described above and shown in the accompanying figures, it should be understood that the present invention is not limited to the embodiments disclosed, but is capable of numerous rearrangements, modifications and substitutions without departing from the spirit of the invention as set forth and defined by the following claims.

The invention claimed is:

1. A random number generator, comprising:
    a semiconductor optical amplifier (SOA) operable to produce an optical flux by emitting photons;
    first circuitry configured to generate first and second signals corresponding to an intensity of the optical flux, the second signal being delayed in time as compared to the first signal; and
    second circuitry configured to generate a random number based, at least in part, on the first signal and the second signal.

2. The random number generator of claim 1, wherein the SOA emits the photons in one or more optical field modes.

3. The random number generator of claim 2, wherein the SOA is a single polarization SOA.

4. The random number generator of claim 1, wherein the first circuitry comprises a splitter that splits the optical flux into at least a first output flux corresponding to the first signal and a second output flux corresponding to the second signal.

5. The random number generator of claim 4, wherein the first circuitry further comprises:
    an optical delay that receives the second output flux and produces a delayed version of the second output flux;
    a first optical detector that receives the first output flux and produces the first signal; and
    a second optical detector that receives the delayed version of the second output flux and produces the second signal.

6. The random number generator of claim 5, wherein the second circuitry comprises:
    a comparator that receives the first signal and the second signal and produces a difference signal corresponding to a difference between the first signal and the second signal; and
    an analog-to-digital converter that converts the difference signal into a digital signal corresponding to the random number.

7. The random number generator of claim 5, wherein the first optical detector and the second optical detector are connected as a balanced detector pair, and the second circuitry produces an output signal corresponding to the random number based at least in part on an output of the balanced detector pair.

8. The random number generator of claim 5, wherein the second circuitry comprises:
    a first analog-to-digital converter that converts the first signal into a first digital signal;
    a second analog-to-digital converter that converts the second signal into a second digital signal; and
    a combiner that combines the first digital signal and the second digital signal to produce an output signal corresponding to the random number.

9. The random number generator of claim 1, wherein the second circuitry comprises a combiner comprising an XOR circuit.

10. The random number generator of claim 1, wherein the first circuitry comprises:
    an optical detector that outputs an analog signal corresponding to the intensity of the optical flux;
    an analog-to-digital converter that converts the analog signal into a digital signal, the digital signal corresponding to the first signal; and
    a digital delay that produces a delayed version of the digital signal, the delayed version of the digital signal corresponding to the second signal.

11. The random number generator of claim 10, wherein the second circuitry comprises a combiner that combines the first signal and the second signal to produce an output signal corresponding to the random number.

12. A method, comprising:
    producing, by a semiconductor optical amplifier (SOA), an optical flux by emitting photons;
    generating, by first circuitry, first and second signals corresponding to an intensity of the optical flux, the second signal being delayed in time as compared to the first signal; and
    generating, by second circuitry, a random number based, at least in part, on the first signal and the second signal.

13. The method of claim 12, further comprising:
    emitting, by the SOA, the photons in one or more optical field modes.

14. The method of claim 12, further comprising:
    splitting, by a splitter of the first circuitry, the optical flux into at least a first output flux corresponding to the first signal and a second output flux corresponding to the second signal.

15. The method of claim 14, further comprising:
    receiving, by an optical delay of the first circuitry, the second output flux;
    producing, by the optical delay, a delayed version of the second output flux;
    receiving, by a first optical detector of the first circuitry, the first output flux;
    producing, by the first optical detector, the first signal;
    receiving, by a second optical detector of the first circuitry, the delayed version of the second output flux; and
    producing, by the second optical detector, the second signal.

16. The method of claim 15, further comprising:
    receiving, by a comparator of the second circuitry, the first signal;
    receiving, by the comparator, the second signal;
    producing, by the comparator, a difference signal corresponding to a difference between the first signal and the second signal; and
    converting, by an analog-to-digital converter of the second circuitry, the difference signal into a digital signal corresponding to the random number.

17. The method of claim 15, wherein the first optical detector and the second optical detector are connected as a balanced detector pair, and wherein the method further comprises:
    producing, by the second circuitry, an output signal corresponding to the random number based at least in part on an output of the balanced detector pair.

18. The method of claim 15, further comprising:
    converting, by a first analog-to-digital converter of the second circuitry, the first signal into a first digital signal;
    converting, by a second analog-to-digital converter of the second circuitry, the second signal into a second digital signal; and
    combining, by a combiner of the second circuitry, the first digital signal and the second digital signal to produce an output signal corresponding to the random number.

19. The method of claim 12, wherein the second circuitry comprises a combiner comprising an XOR circuit.

20. The method of claim 12, further comprising:
    outputting, by an optical detector of the first circuitry, an analog signal corresponding to the intensity of the optical flux;

converting, by an analog-to-digital converter of the first circuitry, the analog signal into a digital signal, the digital signal corresponding to the first signal; and producing, by a digital delay of the first circuitry, a delayed version of the digital signal, the delayed version of the digital signal corresponding to the second signal.

21. The method of claim 20, further comprising:

combining, by a combiner of the second circuitry, the first signal and the second signal to produce an output signal corresponding to the random number.

* * * * *

UNITED STATES PATENT AND TRADEMARK OFFICE
CERTIFICATE OF CORRECTION

PATENT NO.         : 10,564,933 B2
APPLICATION NO.    : 15/884871
DATED              : February 18, 2020
INVENTOR(S)        : Jane Elizabeth Nordholt et al.

It is certified that error appears in the above-identified patent and that said Letters Patent is hereby corrected as shown below:

In the Specification

ACKNOWLEDGEMENT OF GOVERNMENT SUPPORT:

Please delete Column 1 Line 20 through Line 23 "This invention was made with government support under Contract No. DE-AC52-06NA25396 awarded by the U.S. Department of Energy. The government has certian rights in the invention."

And insert --This invention was made with government support HR0011410175 awarded by DOD/DARPA. The government has certain rights to the invention.--

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*